(12) United States Patent
Ochi et al.

(10) Patent No.: US 6,483,939 B2
(45) Date of Patent: *Nov. 19, 2002

(54) IMAGE PROCESSING

(75) Inventors: Ryuji Ochi, Tokyo (JP); Takeshi Yamazaki, Tokyo (JP); Hisaki Nimiya, Tokyo (JP); Masayuki Ao, Tokyo (JP); Katsu Oshida, Tokyo (JP); Yasuhiro Hayashida, Tokyo (JP); Taishi Yasuda, Tokyo (JP)

(73) Assignee: Sega Enterprises, Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/150,091

(22) Filed: Sep. 9, 1998

(65) Prior Publication Data

US 2001/0040996 A1 Nov. 15, 2001

(30) Foreign Application Priority Data

Sep. 11, 1997 (JP) ............................................. 9-247222

(51) Int. Cl.⁷ ............................. G06K 9/00; G06T 15/10
(52) U.S. Cl. ........................ 382/154; 382/276; 345/427
(58) Field of Search ................................ 382/154, 201, 382/285, 276, 286, 296, 305; 463/29–36; 345/427, 473, 474, 619, 649, 655, 672, 681

(56) References Cited

U.S. PATENT DOCUMENTS

| 5,415,550 A | * | 5/1995 | Aoki et al. ................... 434/61 |
| 5,588,914 A | * | 12/1996 | Adamczyk ................... 463/32 |
| 5,755,620 A | * | 5/1998 | Yamamoto et al. ........... 463/34 |
| 5,830,066 A | * | 11/1998 | Goden et al. .................. 463/33 |
| 5,938,530 A | * | 8/1999 | Watanabe .................... 463/31 |
| 5,971,852 A | * | 10/1999 | Itai et al. ....................... 463/31 |
| 5,971,853 A | * | 10/1999 | Kataoka et al. .............. 463/36 |
| 5,989,123 A | * | 11/1999 | Tosaki et al. ................. 463/37 |
| 6,139,433 A | * | 10/2000 | Miyamoto et al. ........... 463/32 |
| 6,171,186 B1 | * | 1/2001 | Kurosawa et al. ............ 463/31 |

OTHER PUBLICATIONS

Japanese Patent Laid–Open (Kokai) Publication No. HEI 9-167256.

* cited by examiner

Primary Examiner—Leo Boudreau
Assistant Examiner—Kanji Patel
(74) Attorney, Agent, or Firm—Keating & Bennett, LLP

(57) ABSTRACT

A picture processing apparatus having a shape memory with shape data of an object previously stored therein, a processor to set a coordinate value of an object in a three-dimensional virtual space of the basis of the shape date stored in the shape memory, a transformation device to receive the coordinate value set by the processor and transform the coordinate value into a visual field coordinate system based on a specified visual point, and a visual point setting device to move the visual point position from a predetermined standard position for a predetermined base object as defined in the three-dimensional virtual space on the basis of data of the base object as well as changes in the situation caused by the movement of the base object, and for sending a new position after the movement to the transformation device.

33 Claims, 18 Drawing Sheets

FIG.4A FIG.4B FIG.4C
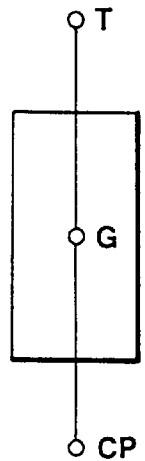
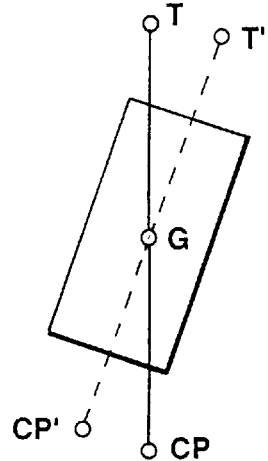
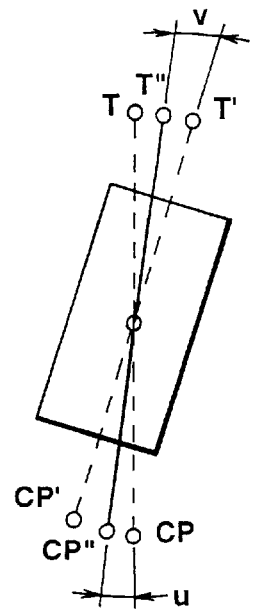
FIG.5
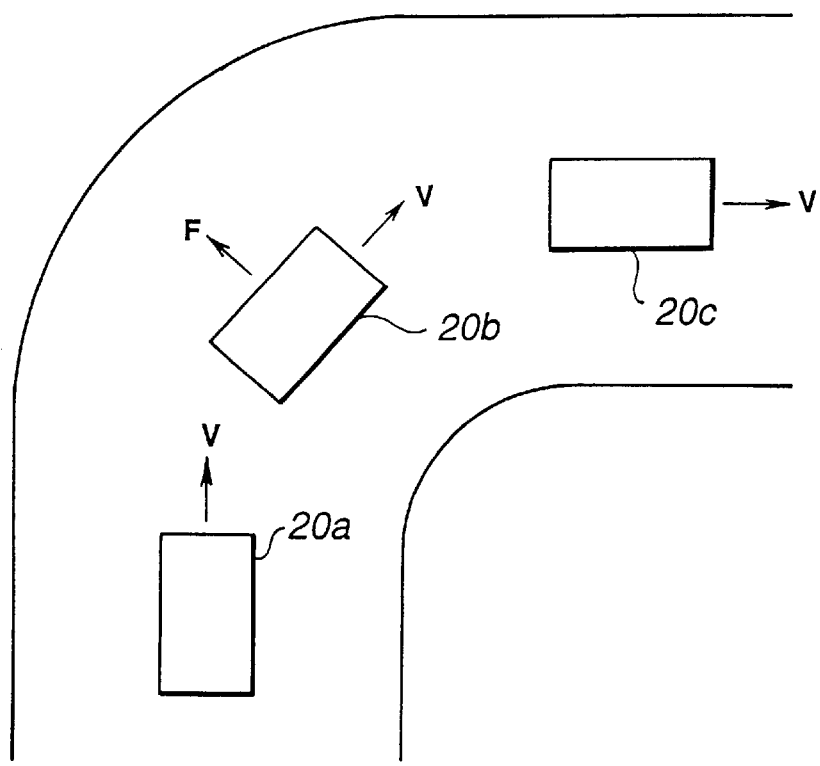

START POINT
AREA 1
AREA 2
AREA 3
EACH GOOL POINT

IMAGE PROCESSING

BACKGROUND OF THE INVENTION

1. Field of the Invention

The present invention relates to a image processing apparatus and method for generating pictures of objects defined in a three-dimensional virtual space as seen from a specified visual point, and to a medium with a program stored therein for realizing such picture processing.

2. Description of the Related Art

A game apparatus is known with which a player watches game pictures displayed on a display, while racing cars or the like are caused to run in a course set in a virtual space in accordance with the player's operation, thereby causing the racing cars or the like to contend for precedence.

Such a game apparatus provides a so-called subjective picture which shows a scene ahead as seen from a visual point of a driver of a racing car, and a so-called objective picture which shows a scene ahead as seen from behind the racing car and which also includes the racing car itself. Concerning this type of conventional objective picture, its visual point is fixed, for example, at an elevated position behind the racing car. However, this fixed objective visual point has a problem in that when a course for the racing car to run has a slope and an angle of the slope changes suddenly, the visual point sinks beneath the course and, accordingly, strange pictures of a game space are displayed as seen from the back side of the course. Moreover, pictures of the course as seen from the fixed objective visual point are displayed as if the course is inclined constantly in the same manner, thereby lacking reality.

The Japanese Patent Laid-Open (Kokai) Publication No. HEI 9-167256 discloses a game picture synthesis method which is capable of solving the above-described problems, of presenting a player's car and slopes of a course visually and effectively when the player's car is moving in the course with varied slopes, and of displaying good pictures. This technique is a game picture synthesis method for setting an objective visual point, which faces in a moving direction of the player's car, behind the player's car moving in a course set in a game object space, and for synthesizing pictures of the object space as seen from the visual point. By this method, when the player's car moves in a horizontal direction or up an ascending slope, the visual point is controlled so that it will be located at an elevated position behind the player's car at a specified position in a world coordinate system in the object space; and when the player's car moves down a downward slope, the visual point is controlled so that it will be located at an elevated position behind the player's car at a specified position in a local coordinate system of the player's car.

However, the above-described publicly known art only changes the position of the objective visual point merely mechanically by using a horizontal line as a basis, thereby lacking flexibility. The pictures obtained are unnatural, and it is impossible to expect natural pictures for a player, for example, realistic pictures like those of on-the-spot relay broadcasting of an actual car race. Moreover, although the above-described publicly known art refers to changes in the position of the objective visual point, there is no description about changes in the position of the subjective visual point. The position of the subjective visual point should be changed as appropriate in order to provide more realistic pictures.

SUMMARY OF THE INVENTION

The present invention is intended to solve the above-described problems. It is an object of this invention to provide a picture processing apparatus and method capable of providing more natural and preferred pictures by making it possible to change either the subjective visual point position or the objective visual point position, or both of them, and a medium with a program stored therein for realizing such picture processing.

A picture processing apparatus according to the present invention comprises:

a shape memory with shape data of an object previously stored therein;

a processor for setting a coordinate value of an object in a three-dimensional virtual space on the basis of the shape data stored in the shape memory;

transformation means for receiving the coordinate value set by the processor and transforming the coordinate value into a visual field coordinate system based on a specified visual point; and visual point setting means for moving the visual point position from a predetermined standard position for a predetermined base object as defined in the three-dimensional virtual space on the basis of data of the base object as well as changes in the situation caused by the movement of the base object, and for sending a new position after the movement to the transformation means.

With the picture processing apparatus according to this invention, the visual point setting means sets a sight line direction in addition to the visual point position.

With the picture processing apparatus according to this invention, the visual point setting means sets the visual point position in accordance with a turning angle of the object.

An example of this invention is shown in FIG. 4.

With the picture processing apparatus according to this invention, the visual point setting means sets the visual point position and the sight line direction in accordance with a turning angle of the object and causes a displacement corresponding to the visual point position to disagree with a displacement corresponding to the sight line direction.

With the picture processing apparatus according to this invention, a ratio of the displacement of the visual point position to the displacement of the sight line direction is 1:5.

With the picture processing apparatus according to this invention, the visual point setting means sets the visual point position according to acceleration applied to the object when it makes a turn.

Examples of this invention are shown in FIGS. 6 through 11.

With the picture processing apparatus according to this invention, the displacement of the visual point position is proportionate to the acceleration.

With the picture processing apparatus according to this invention, a direction of the visual point position displacement is identical to a direction of the acceleration.

With the picture processing apparatus according to this invention, a direction of the visual point position displacement is opposite to a direction of the acceleration.

With the picture processing apparatus according to this invention, the visual point setting means causes a travelling direction of the object, the sight line direction, and a course in which the object should move, to disagree with one another.

With the picture processing apparatus according to this invention, the visual point setting means sets the visual point position and the sight line direction so that the base object will be situated in the center of a picture when a displacement is small, while the base object will be situated at the edge of a picture when the displacement is large.

With the picture processing apparatus according to this invention, the visual point setting means sets the visual point position by following the movement of the base object.

With the picture processing apparatus according to this invention, the visual point setting means sets a time delay between the movement of the base object and the movement of the visual point position.

As a specific example of this invention, there is a method described below:

(a) When a camera follows a car or character, and if the character moves in a vertical or horizontal direction, the camera follows the movement of the character with some delay.

(b) The camera is caused to follow the player's character so that the camera will always provide pictures of scenes ahead as seen from behind the character.

In a specific course situation such as at the time of cornering or jumping, the camera visual point is adjusted or changed in order to show the relevant scenes of strong appeal to a player. The camera follows the movement of the player's character with some delay, thereby enhancing the appealing effect of the visual point.

With the picture processing apparatus according to this invention, the visual point setting means sets the visual point position in accordance with a specified manipulated variable regarding the base object.

Examples of this invention are shown in FIGS. 18 and 19.

With the picture processing apparatus according to this invention, the displacement of the visual point position has a nonlinear relationship with the specified manipulated variable.

With the picture processing apparatus according to this invention, a part of the specified manipulated variable includes a dead zone where no displacement of the visual point position is caused.

With the picture processing apparatus according to this invention, the visual point setting means sets the visual point position in accordance with acceleration of the object.

With the picture processing apparatus according to this invention, the visual point position is set upon deceleration of the object so that the visual point will approach the base object.

With the picture processing apparatus according to this invention, the visual point position is set upon acceleration of the object so that the visual point will move away from the object and will approach a predetermined position.

With the picture processing apparatus according to this invention, when the object jumps, the visual point position is set so that the visual point will move away from the object after the jump, will then approach a predetermined position and will come to the predetermined position upon landing.

With the picture processing apparatus according to this invention, when the base object is the object and moves in a branched course, the visual point setting means sets the visual point position so that the visual point will move away from the object while the object is moving between a predetermined first position in front of a branch point and a second position, and the visual point will return to the predetermined position when the object passes through the second position.

A region from the first position to the second position is, for example, a selection zone for selecting a course, and the second position is a check point which is, for example, the basis for selecting the course.

With the picture processing apparatus according to this invention, the selection of the branched course is made according to the state of the object at the second position.

Examples of the state of an object are a transit position of the object, a passing speed, obtained scores, and other circumstances.

With the picture processing apparatus according to this invention, when the selection of the branched course is made, an obstructive limitation is given to a course which has not been selected.

This obstructive limitation is intended, for example, to deny a player from advancing to another course or being shown other courses. Examples of such an obstructive limitation include rocks, doors and enemies.

A picture processing apparatus according to this invention is a picture generating apparatus for generating a picture at an attention point as seen from a visual point. The visual point is set at a specified elevated position behind a moving object moving in a virtual space, and the attention point is set at a specified position in a moving direction of the moving object. The picture generating apparatus comprises visual point position setting means for moving the visual point position after, with some delay, any change in a posture of the moving object when such a change occurs, and for causing the visual point to approach the specified position of the moving object.

The picture processing apparatus according to this invention is the picture generating apparatus which comprises attention point setting means for moving the attention point after, with some delay, any change in the moving direction of the moving object when such a change occurs, and for causing the attention point to approach the specified position of the moving object.

With the picture generating apparatus according to this invention, a visual point moving speed of the visual point position setting means is slower than an attention point moving speed of the attention point position setting means.

The picture processing apparatus according to this invention is the picture generating apparatus for generating a picture of a virtual space as seen from a visual point, the visual point being set at a specified elevated position behind a moving object moving in the virtual space. The picture generating apparatus comprises:

moving direction accepting means for accepting a moving direction designation for the moving object from an operator; and visual point position setting means for moving the visual point position in a direction opposite to the moving direction designation.

With the picture generating apparatus according to this invention, the moving direction accepting means accepts the moving direction designation of multistage levels, and the visual point position setting means moves the visual point position to a position corresponding to the level of the moving direction designation.

With the picture generating apparatus according to this invention, the visual point position setting means considers, in addition to the moving direction designation given by the operator, a turning direction of a course in the virtual space for the moving object to travel and then moves the visual point position in a direction opposite to the turning direction.

A picture processing method according to this invention comprises:

a coordinate setting step of setting a coordinate value of an object in a three-dimensional virtual space on the basis of shape data stored in a shape memory;

a transformation step of receiving the coordinate value set by the coordinate setting step and transforming the coordinate value into a visual field coordinate system based on a specified visual point; and a visual point setting step of moving the visual point position from a predetermined standard position on the basis of data of a predetermined base object as defined in the three-dimensional virtual space as well as changes in the situation caused by the movement of the base object, and setting a new position after the movement as the specified visual point in the transformation step.

Concerning the picture processing method according to this invention, in the visual point setting step, a sight line direction is set in addition to the visual point position.

Concerning the picture processing method according to this invention, in the visual point setting step, the visual point position is set according to a turning angle of the object.

Concerning the picture processing method according to this invention, in the visual point setting step, the visual point position is set according to acceleration applied to the object when it makes a turn.

Concerning the picture processing method according to this invention, in the visual point setting step, the visual point position and the sight line direction are set so that the base object will be situated in the center of a picture when a displacement is small, while the base object will be situated at the edge of a picture when the displacement is large.

Concerning the picture processing method according to this invention, in the visual point setting step, the visual point position is set by following the movement of the base object.

Concerning the picture processing method according to this invention, in the visual point setting step, the visual point position is set in accordance with a specified manipulated variable regarding the base object.

Concerning the picture processing method according to this invention, in the visual point setting step, the visual point position is set in accordance with acceleration of the object.

Concerning the picture processing method according to this invention, in the visual point setting step, when the base object is the object and moves in a branched course, the visual point position is set so that the visual point will move away from the object while the object is moving between a predetermined first position in front of a branch point and a second position, and the visual point will return to the predetermined position when the object passes through the second position.

A medium according to this invention has a program stored therein for causing a computer to perform a coordinate setting procedure, a transformation procedure and a visual point setting procedure. The coordinate setting procedure is for setting a coordinate value of an object in a three-dimensional virtual space on the basis of shape data stored in a shape memory. The transformation procedure is for receiving the coordinate value set by the coordinate setting procedure and for transforming the coordinate value into a visual field coordinate system based on a specified visual point. The visual point setting procedure is for moving the visual point position on the basis of data of a predetermined base object as defined in the three-dimensional virtual space as well as the state of the base object.

Examples of the medium include a floppy disk, a hard disk, a magnetic tape, a magneto-optical disk, a CD-ROM, a DVD, a ROM cartridge, a RAM memory cartridge with a battery backup, a flash memory cartridge, and a nonvolatile RAM cartridge.

Moreover, examples of the medium include communication media such as a wire communication medium like a telephone line and a radio communication medium like a microwave circuit. The Internet is also included in the communication media herein referred to.

The above-mentioned medium is a medium with information (generally digital data and programs) recorded therein by some kind of physical means and is capable of causing a processing unit such as a computer or a dedicated processor to perform specified functions. Namely, any medium may be used as long as it is capable of down loading programs onto a computer by whatever means and of causing the computer to perform specified functions.

BRIEF DESCRIPTION OF THE DRAWINGS

FIG. 4 illustrates the movement of an objective camera position according to the first embodiment of this invention.

FIG. 5 is a top view of a car driven by a player in a race game according to the first embodiment of this invention when the car is making a turn in the virtual space.

DESCRIPTION OF THE PREFERRED EMBODIMENTS

First Embodiment

A first embodiment of this invention is hereinafter explained by referring to the attached drawings. This first embodiment relates to a car race game in which off-road cars run on an unleveled ground. With this type of game, it is necessary to express the drifting of a car body caused by an abrupt handle operation and strong vertical movements caused by a rough road surface. Accordingly, the control of the camera visual point position described below has a remarkable effect.

Figure 1:
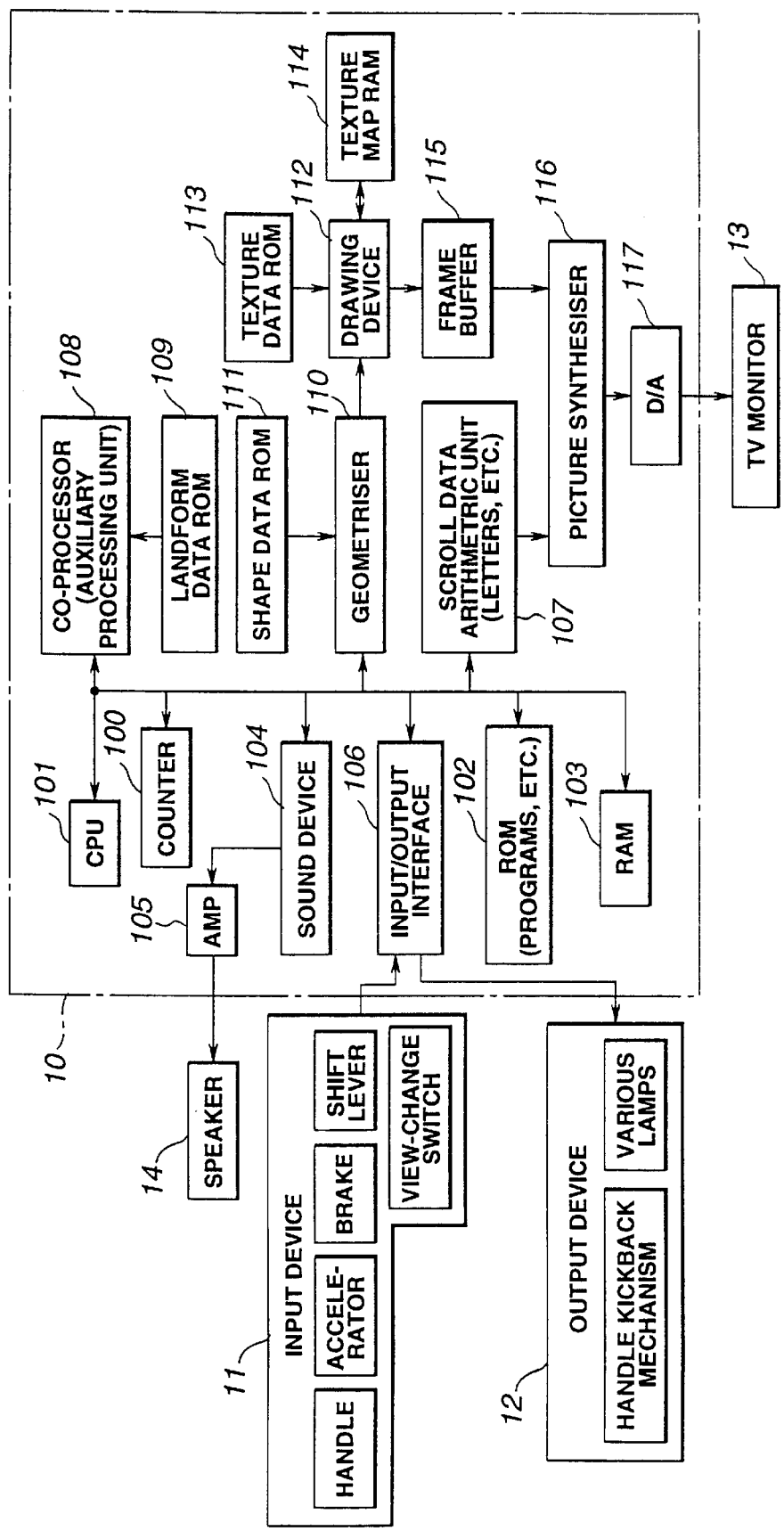
FIG. 1 is a functional block diagram showing the portion that performs picture generation processing in a game apparatus according to a first embodiment of the present invention.

FIG. 1 is a functional block diagram which shows the portion of a game apparatus according to the first embodiment that performs picture generation processing. The apparatus shown in FIG. 1 comprises, as basic elements, a main game device 10, a TV monitor 13, and a speaker 14. Signals from an outside sensor are sent to an input/output interface 106 described below. The TV monitor 13 displays pictures of the state of progress of a game. A projector may be used in place of the TV monitor.

The game device 10 has a CPU (central processing unit) 101 and also comprises a ROM 102, a RAM 103, a sound device 104, an input/output interface 106, a scroll data arithmetic unit 107, a co-processor (auxiliary processing unit) 108, a landform data ROM 109, a geometrizer 110, a shape data ROM 111, a drawing device 112, a texture data ROM 113, a texture map RAM 114, a frame buffer 115, a picture synthesizer 116, and a D/A converter 117. The ROM 102 as a storage medium in this invention may include other storage means, such as a hard disk, a cartridge-type ROM, a CD-ROM, and other various kinds of publicly known media, and may also include communication media (the Internet and various kinds of personal computer communication networks).

The CPU 101 is connected through bus lines to the ROM 102 with specified programs and the like stored therein, the RAM 103 for storing data, the sound device 104, the input/output interface 106, the scroll data arithmetic unit 107, the co-processor 108 and the geometrizer 110. The RAM 103 functions as a buffer, so that various commands (including a command to display objects) to the geometrizer 110 are written thereon and a matrix at the time of transformation matrix operation is written thereon.

The sound device 104 is connected through a power amplifier 105 to the speaker 14. Acoustic signals generated by the sound device 104 undergo power amplification and are then sent to the speaker 14.

According to this embodiment, the CPU 101 reads in, based on the program installed in the ROM 102, the progress of a game story, landform data from the ROM 109, or shape data (three-dimensional data including "objects such as rides (vehicles)" and "game background such as roads, landscape, buildings, indoor scenes, and underpasses") from the shape data ROM 111, and then performs, for example, situation setting in the three-dimensional virtual space and shooting processing with regard to trigger signals from an input device 11.

Concerning various types of objects in the virtual game space, after coordinate values in the three-dimensional space are determined, a transformation matrix for transforming the coordinate values into the visual field coordinate system and the shape data (of buildings, landform, indoor scenes, laboratories, furniture and the like) are designated in the geometrizer 110. The landform data ROM 109 is connected to the co-processor 108. Therefore, the landform data such as a predetermined camera movement course is given to the co-processor 108 (and the CPU 101). The co-processor 108 is designed to, for example, make a hit assessment upon shooting and perform control operations regarding a deviation of the camera sight line from objects or the movement of the sight line. The co-processor 108 assumes the operation of floating points during this assessment and computation. As a result, the co-processor 108 carries out the hit assessment upon shooting objects and the arithmetic operation of the sight line moving position in relation to the location of the relevant objects, and the results thereof are given to the CPU 101.

The geometrizer 110 is connected to the shape data ROM 111 and the drawing device 112. The shape data ROM 111 has previously stored therein the polygon shape data (three-dimensional data consisting of respective vertexes, which compose buildings, walls, corridors, indoor scenes, landscape, background, a main character, objects on the main character's side, and plural types of other rides), and this shape data is delivered to the geometrizer 110. The geometrizer 110 performs perspective transformation of the shape data designated by the transformation matrix sent from the CPU 101 and obtains the data transformed from the coordinate system in the three-dimensional virtual space into the visual field coordinate system.

The drawing device 112 pastes textures onto the transformed shape data of the visual field coordinate system, and outputs such data to the frame buffer 115. In order to paste the textures, the drawing device 112 is connected to the texture data ROM 113 and the texture map RAM 114, and also to the frame buffer 115. Polygon data means a group of data of relative or absolute coordinates of respective vertexes of polygons (polygons: mainly triangles or quadrangles) which are made of an aggregate of a plurality of vertexes. The landform data ROM 109 stores polygon data which are set comparatively rough to satisfy the movement of the camera in the virtual space along with a game story. On the other hand, the shape data ROM 111 stores polygon data which are set in more detail with regard to the shapes composing pictures of enemies, background and the like.

The scroll data arithmetic unit 107 performs operations of scroll picture data such as letters. This arithmetic unit 107 and the above-mentioned frame buffer 115 are connected to the picture synthesizer 116 and the D/A converter 117 and then to the TV monitor 13. This allows the polygon picture (simulation results), including the objects (rides) and landscape (background), which is temporarily stored in the frame buffer 15, and the scroll picture with other letter information (such as time count on the player's side), to be synthesized in accordance with a designated priority, thereby generating final frame picture data. This picture data is converted by the D/A converter 117 into analog signals, which are sent to the TV monitor 13. Then, pictures of the game are displayed on a real time basis.

Figure 2:
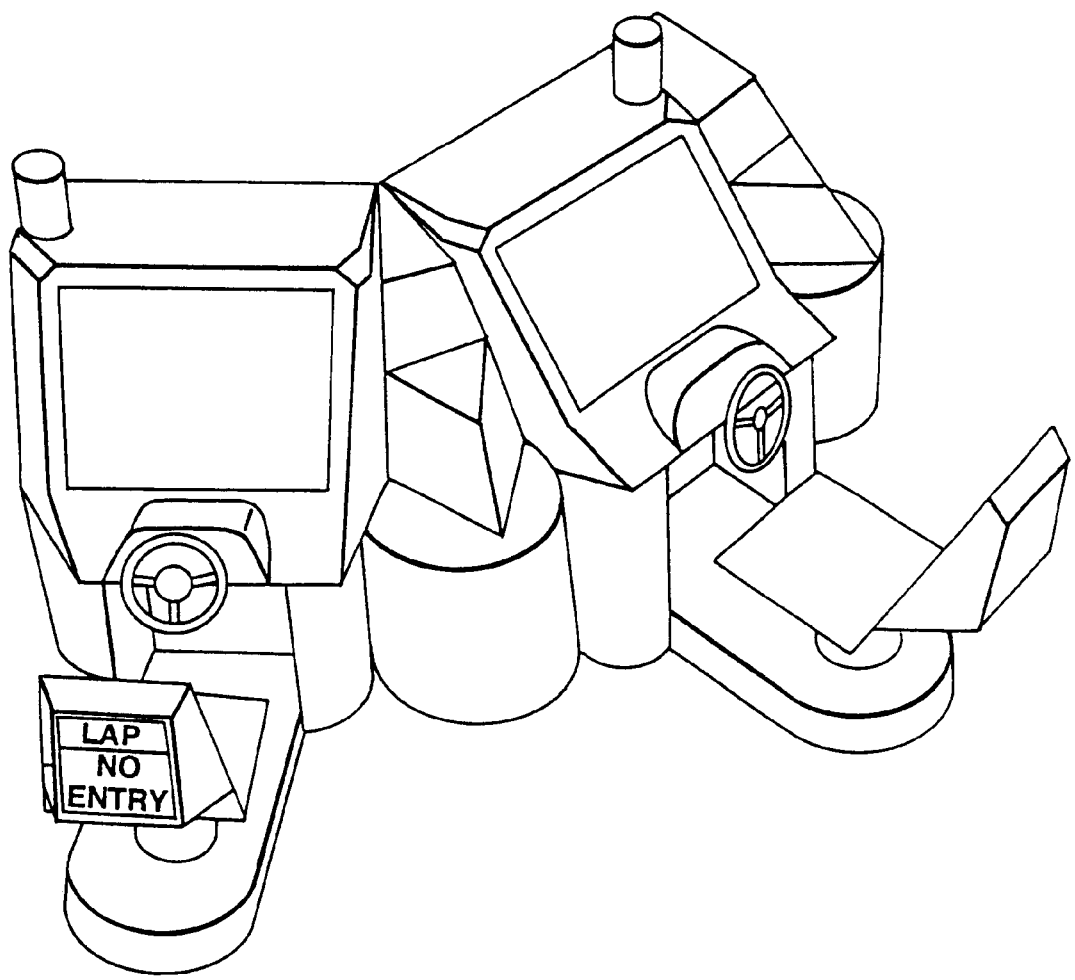
FIG. 2 is a schematic exterior view of the game machine according to the first embodiment of this invention.

FIG. 2 is a schematic exterior view of game machines according to this invention. In this drawing, two game machines are placed side by side (more than two game machines may be placed).

Figure 3:
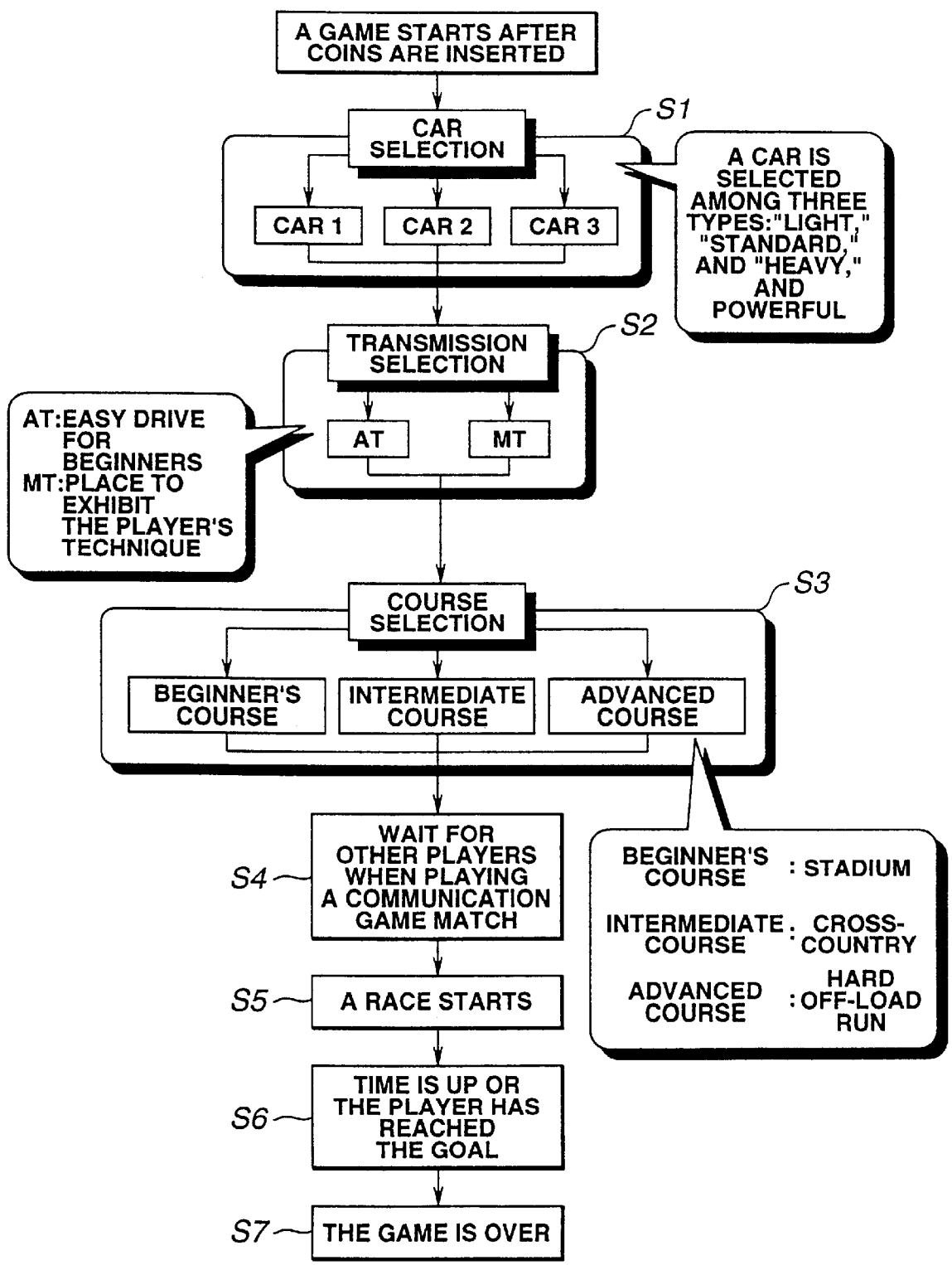
FIG. 3 is a flowchart which shows the operational procedure for the game machine according to the first embodiment of this invention.

FIG. 3 is a flowchart which shows the operational procedure for the game machines. A player first selects a car type to use (S1: Car Selection). The player can select a car among three types: "Light," "Standard," and "Heavy and Powerful. " The player then selects a transmission to use (S2). He/she can select either an automatic transmission (AT) for beginners or a manual transmission (MT) for advanced players. Next, the player selects a course (S3). He/she may choose any one of a "stadium" for the beginner's course, a "cross-country" for the intermediate course, and a "hard off-road run" for the advanced course. In the case of a communication game match of the game machines, that is, when the player plays a game with a player of another game machine, the player waits for another player to get ready for the game (S4). When the player does not play a communication game match, the race immediately starts (S5). An assessment is made whether the time is up or whether the player's car has reached the goal (S6). If so, it is determined that the game is over (S7), thereby terminating the game.

The schematic configuration of the game machine according to this embodiment has been described above. Now, an explanation is hereinafter given by focusing on the features of this invention. The following processing is performed mainly by software.

(1) Camera Position

First, the movement of the objective camera position is described. The objective camera position is a visual point which is located outside the player's car and which is used to show a picture including the player's car on the screen as in the on-the-spot television broadcasting. In order to enhance the realistic excitement by using this objective camera position, it is desirable that the camera position be moved in a horizontal direction and the camera direction be changed in accordance with side gravity (gravity caused by a centrifugal force) upon cornering just like in the actual on-the-spot broadcasting. Namely, it is important to express the side gravity at the time of cornering. The realistic excitement of the game will be further enhanced if the camera position is moved with vertical vibrations in addition to the above-described horizontal movement. A specific method of moving the objective camera position will be described later.

Next, an explanation is given about the movement of the subjective camera position. The subjective camera position is the player's visual point, for example, an actual visual point of a race driver. In order to enhance the realistic excitement of the game by using this subjective camera position, it is desirable that the camera position be moved in a vertical direction within a cockpit in a link motion with vertical movements of the ground in a race. Namely, it is important to express the visual point of a man sitting on a driver's seat. The realistic excitement of the game will be further enhanced if the camera position is moved with vertical vibrations in addition to the above-described vertical movement. A specific method of moving the subjective camera position will be described later.

(2) Movement of the Objective Camera Position

The camera position is moved in a horizontal direction and the camera direction is changed in accordance with the side gravity at the time of cornering. Accordingly, the side gravity upon cornering is expressed.

FIG. 4 is used to explain a specific example.

FIG. 4(*a*) is a diagram showing the state of a previous frame. This drawing is a top view. "CP" represents the camera position, "T" represents the camera direction, and "G" represents a fixed position for the camera. The camera moves on the basis of this position G.

FIG. 4(*b*) shows a car position of a present frame to be displayed. It is apparent that the car has turned to the right, as compared with the previous frame. At this time, CP' is a standard camera position (that is, a camera position by a conventional method) at the car position of the present frame. Similarly, T' indicates a standard camera direction at the car position of the present frame. As can be seen in this drawing, the camera position is turned according to a turning angle of the car by the conventional method, and there is no change in the relative position relationship between the camera position CP and the camera direction T. Accordingly, with the camera position in FIG. 4(*b*), the player's car to be displayed on the screen is expressed uniformly, thereby lacking reality.

FIG. 4(*c*) describes a method of moving the objective camera position according to the first embodiment of this invention with an improvement with regard to the above-described problem. CP" indicates a camera position of the present frame to be obtained by this method, and T" indicates a camera direction at such a position. The camera position CP" can be obtained by moving the camera position CP of the previous frame closer to the position CP' by 10% (as indicated by "U" in FIG. 4(c)) of an angle of difference between the camera position CP of the previous frame and the standard camera position CP' of the present frame. Similarly, the camera direction T" can be obtained by moving the camera direction T of the previous frame closer to the camera direction T' by 50% (as indicated by "V" in FIG. 4(c)) of an angle of difference between the camera direction T and the camera direction T'.

The percent by which the camera direction is moved is larger than the percent by which the camera position is moved, because it is desirable that the camera direction be moved faster than the camera position. Such a moving method intends to express the visual point from, for example, a helicopter. The camera position corresponds to the helicopter position, and the camera direction corresponds to a camera direction turned by a cameraman. Of course, the camera position may be decided by the size of the side gravity calculated with a curvature of the course and speed. Explanations will be hereinafter given with this regard.

FIG. 5 is a top view of a car which is driven by the player of a race game and which is making a turn in the virtual space. A centrifugal force F is applied to a car 20C, which is turning the curve, in a direction perpendicular to a travelling direction V.

Figure 6A:
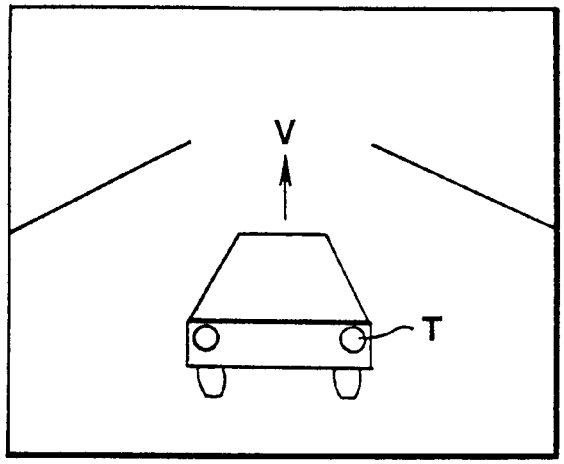
FIG. 6 shows an example picture according to the first embodiment of this invention when the car is making a straight advance at speed V, and also indicates an objective camera position C in such a situation.
Figure 6B:
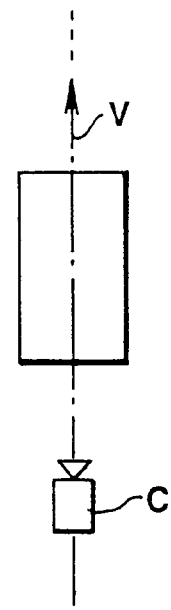

FIG. 6 shows an example picture where the car is making a straight advance at speed V (FIG. 6(a)), and also indicates a camera position C in such a situation (FIG. 6(b)). This situation corresponds to the car 20a in FIG. 5. The camera position C is just behind the car and the camera direction agrees with the speed V of the car. The letter T in FIG. 6(a) indicates a tail lamp of the car.

Figure 7A:
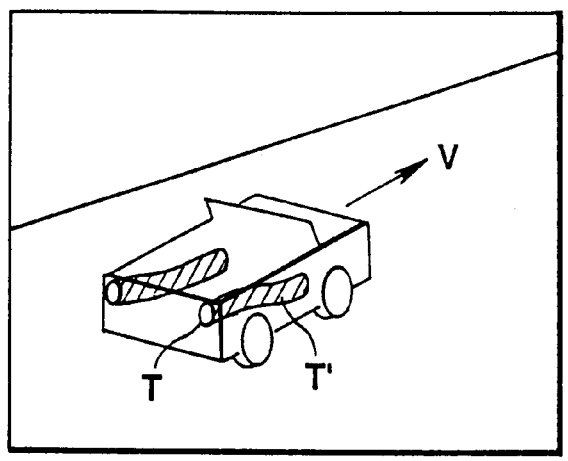
FIG. 7 shows an example picture according to the first embodiment of this invention when the car is making a turn, and also indicates the objective camera position C in such a situation.
Figure 7B:
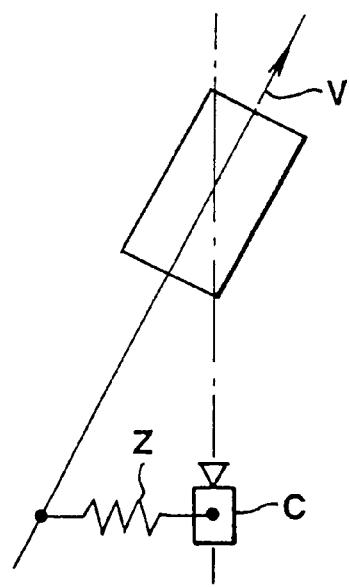

FIG. 7 shows an example picture where the car is making a turn (FIG. 7(a)), and also indicates the camera position C in such a situation (FIG. 7(b)). This situation corresponds to the car 20b in FIG. 5. The camera position in this situation moves toward the inside of the curve as shown in FIG. 4(c), and a camera sight line also turns. Consequently, an image of the car is obtained as seen from behind the car as in FIG. 7(a). Only the camera position will be referred to in the following explanations, but the camera direction is also turned in a specified manner. The letter T in FIG. 7(b) indicates an afterimage of the tail lamp. These kinds of afterimages often occur in real camera images, and are indispensable for expressing strong movements.

Figure 8A:
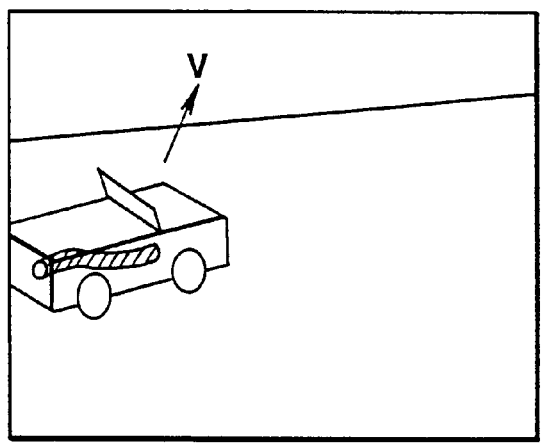
FIG. 8 shows an example picture according to the first embodiment of this invention when the car is making a sharp turn or is making a turn at a high speed, and also indicates the objective camera position C in such a situation.
Figure 8B:
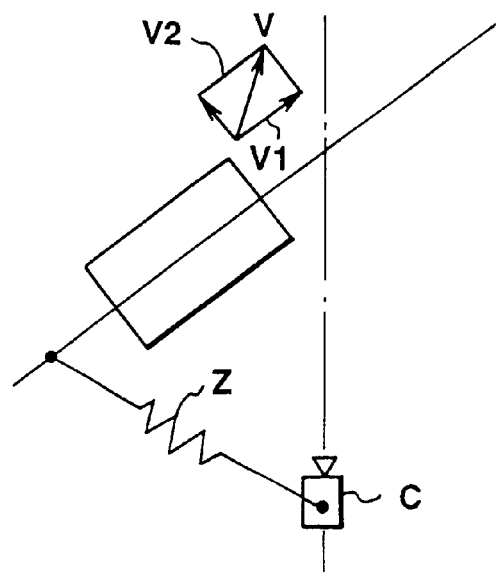

FIG. 8 shows an example picture where the car is making a sharp turn or is making a turn at a high speed (FIG. 8(a)), and also indicates the camera position C in such a situation (FIG. 8(b)). Just as it happens in a real situation, rear wheels or all four wheels of the car sideslip (or drift) in the virtual space, and the car advances not in a straight forward direction, but in a slightly oblique direction (cf. V, V1 and V2 in FIG. 8(b)). With this visual point, it is possible to comprehend the situation where the car is drifting as in FIG. 8(b). Moreover, a strong movement of the camera position C in FIG. 6(b) to the camera position C in FIG. 8(b) makes it possible to make the player feel the strong movement of the car. Furthermore, since in FIG. 8(a) the travelling direction V of the car, the moving direction of the camera position or camera direction, and the course direction disagree with each other, it is possible to make the player feel three-dimensional movements. This can be realized because the system shown in FIG. 1 enables three-dimensional picture processing. In this sense, it is possible to say that the movement of the camera position according to this embodiment is making effective use of the ability of the system in FIG. 1.

A travel amount of the camera position C can be considered as follows. The travel amount of the camera position between the camera position when the car is making a straight advance in FIG. 6(b) and the camera position after the movement is proportionate to the centrifugal force applied to the car. For example, let us assume that a spring Z is provided virtually.

It is also possible to consider the camera direction as follows. When the travel amount is small, the car is located in the center of a picture as in FIG. 7(a). On the other hand, when the travel amount is large, the car is located at the left edge of a picture as in FIG. 8(a). This processing makes it possible to express the state where the camera cannot follow the strong movement of the car, thereby making the picture more realistic.

(3) Movement of the Subjective Camera Position

Figure 9A:
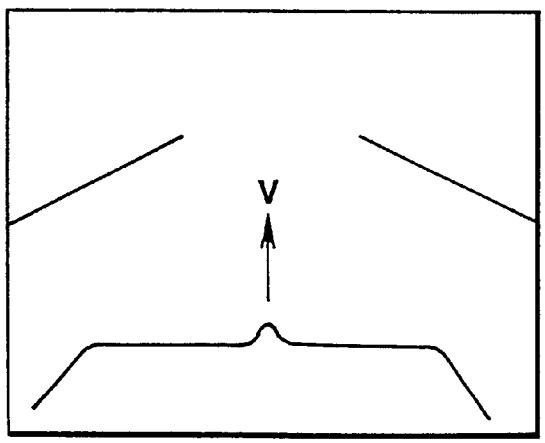
FIG. 9 shows an example picture according to the first embodiment of this invention when the car is making a straight advance at speed V, and also indicates the objective camera position C in such a situation.
Figure 9B:
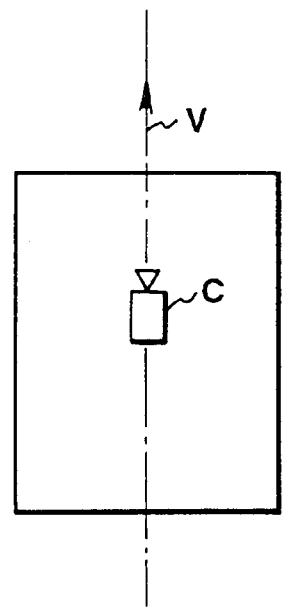

FIG. 9 shows an example picture where the car is making a straight advance at speed V (FIG. 9(a)), and also indicates the camera position C in such a situation (FIG. 9(b)). This situation corresponds to the car 20a in FIG. 5. The camera position C is within the car (for example, a driver's visual point or a navigator's visual point), and the camera direction agrees with the speed V of the car.

Figure 10A:
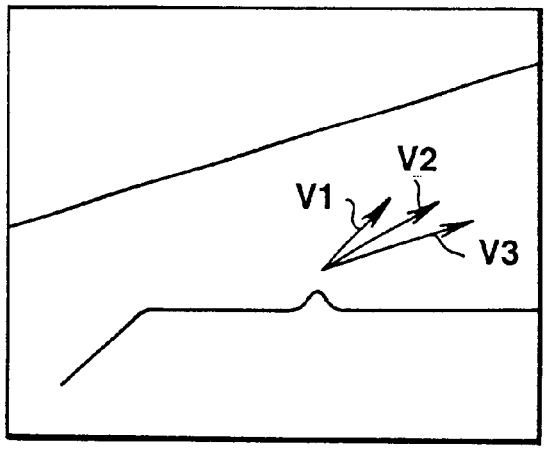
FIG. 10 shows an example picture according to the first embodiment of this invention when the car is making a turn, and also indicates the objective camera position C in such a situation.
Figure 10B:
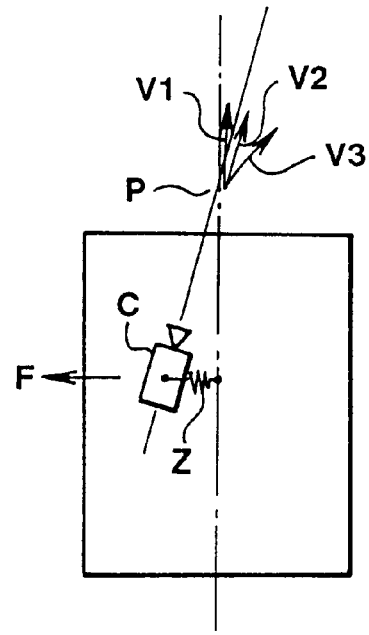

FIG. 10 shows an example picture where the car is making a turn (FIG. 10(a)), and also indicates the camera position C in such a situation (FIG. 10(b)). This situation corresponds to the car 20b in FIG. 5. The camera position in this situation moves toward the outside of the curve due to the centrifugal force F, and the camera sight line also turns. Consequently, an image of the scene is obtained, which shows the car diagonally ahead. At this time, the camera direction may be caused to agree with, or disagree with, the speed of the car. For example, if the speed of the car is V1, the camera direction is inside the curve. If the speed of the car is V2, the camera direction agrees with the curve. If the speed of the car is V3, the camera direction is outside the curve. The state of the speed V1 is where, for example, the car slips and cannot advance in the direction that the player intends to. The state of the speed V3 is where, for example, the car makes a sharp turn and, therefore, the driver is caused to move toward the outside.

Figure 11A:
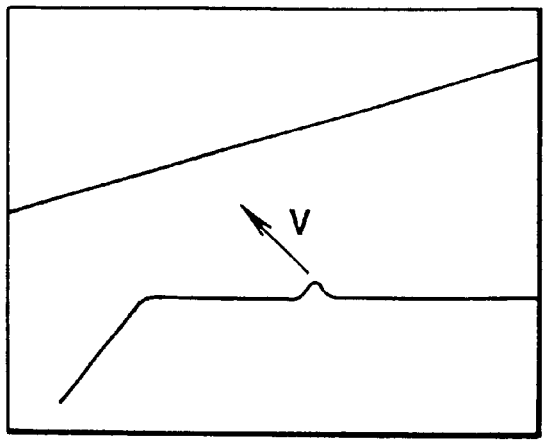
FIG. 11 shows an example picture according to the first embodiment of this invention when the car is making a sharp turn or is making a turn at a high speed, and also indicates the objective camera position C in such a situation.
Figure 11B:
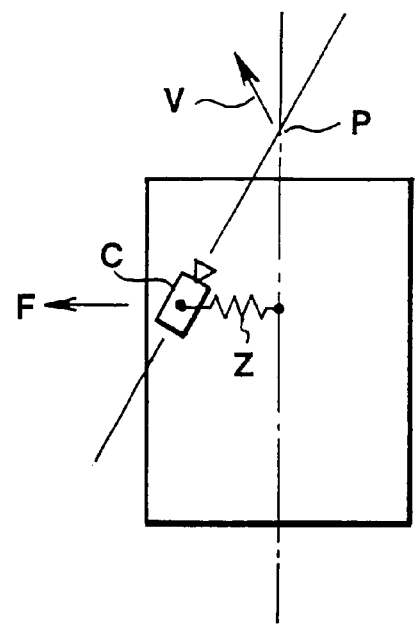

FIG. 11 shows an example picture where the car is making a sharp turn or is making a turn at a high speed (FIG. 11(a)), and also indicates the camera position C in such a situation (FIG. 11(b)). The camera position in this situation moves toward the outside of the curve due to the centrifugal force F, and the camera sight line also turns. The travel amount of the camera position in FIG. 11(b) is larger than that in FIG. 10(b). FIG. 11 shows the state where the car drifts and advances in a direction of the speed V. In this situation, the travelling direction of the car, the camera sight line direction, and the course direction disagree with each other and, therefore, it is possible to make the player feel three-dimensional movements.

The camera positions and the camera directions in FIGS. 10 and 11 simulate the state where a driver actually receives a centrifugal force and his/her body moves toward the outside and the sight line moves toward the inside of the curve. Since the player cannot feel either the centrifugal force or any changes in the sight line direction with the game machine, it is necessary to change the camera position and the camera direction by means of picture processing. In order to make such changes more realistic, it is necessary to simulate the force actually received by the driver and the effect thereof. The camera positions and the camera directions in FIGS. 10(b) and 11(b) are decided from this point of view. Such a decision may be made according to the actual circumstances, not simply according to the physical size of the force. For example, actions of an actual cameraman regarding the objective visual point, and the force received by an actual driver and his/her sight line direction at that time regarding the subjective visual point may be modeled, and the camera position and the camera direction may be decided on the basis of such models.

(4) Vertical Movement of the Camera Position

Explanations have been hereinbefore given about the horizontal movement of the camera position. In addition, the camera position may be moved in a vertical direction.

Figure 12:
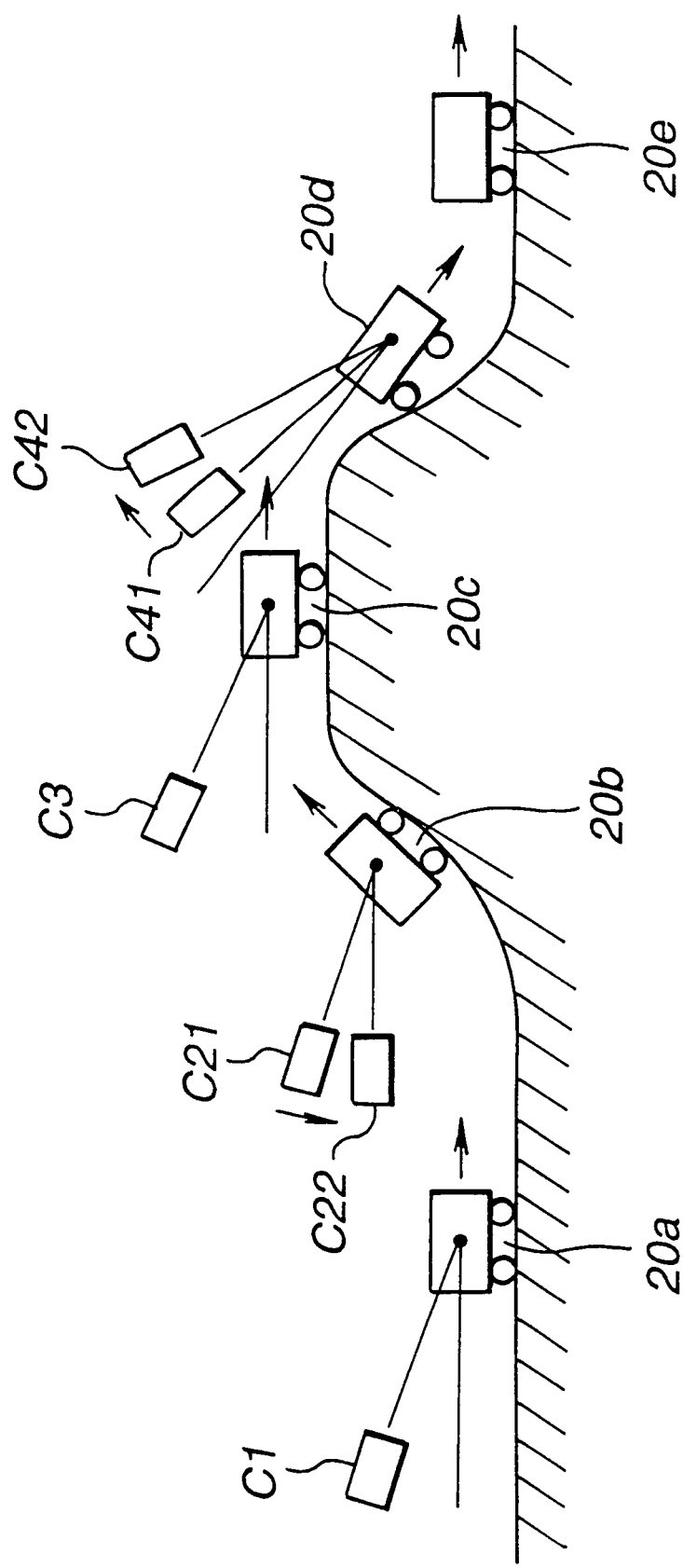
FIG. 12 is a schematic diagram illustrating the movement of a camera position in a vertical direction according to the first embodiment of this invention.

FIG. 12 is a schematic diagram illustrating the vertical movement of the camera position. When the car is at position 20a, the position of a camera C1 is at an elevated position behind the car (normal state). When the car is at position 20b, the car is ascending a slope and a camera C21 is slightly above the horizontal position. A camera C22 shows a conventional example. At the position of the camera C21, a picture of the car as seen from above is obtained. As time elapses, the camera position returns from C21 to C22. At position 20c, the car moves in a horizontal direction and, therefore, the position of a camera C3 is at an elevated position behind the car. At position 20d, the car is descending a slope and, therefore, a camera C41 is placed at a lower position. A camera C42 shows a conventional example. At the position of the camera 41, a picture of the car as seen from below is obtained. As time elapses, the camera position returns from C41 to C42.

A specific method of setting the camera position will be explained in relation to a second embodiment.

(5) Specific Example

A specific example of a method of changing the camera position is as follows:

(a) When the camera follows the car or character, and when the character moves in vertical and horizontal directions, the camera follows such movements with some delay.

(b) The camera is caused to follow the player's character so that the camera will always take pictures of the scene ahead as seen from behind the player's character.

In a specific course state such as upon cornering or jumping, the camera visual point is adjusted and changed so that the relevant scenes will seem to be of strong appeal to the player. The camera follows the movement of the player's character, and the appealing effect of the visual point is enhanced by causing the camera to follow the character with some delay.

Second Embodiment

A second embodiment of this invention is hereinafter explained by referring to the relevant drawings. The second embodiment of this invention relates to a race game in which a player skis downs a slope. This type of game requires expression of strong vertical movements caused by a rough sliding surface. Therefore, control of the camera visual point position hereinafter described has a remarkable effect.

Figure 13:
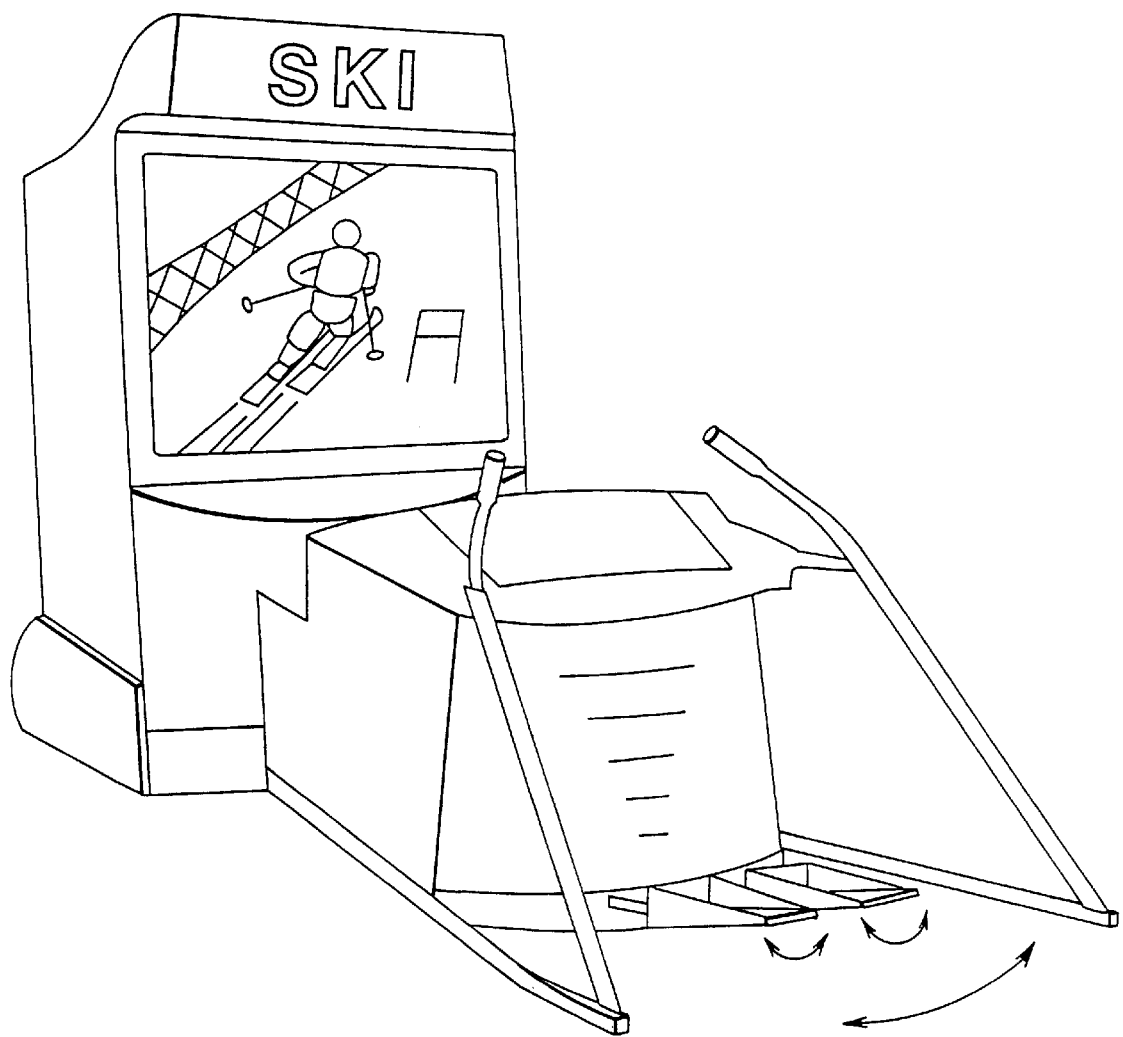
FIG. 13 is a perspective view of a ski game machine according to a second embodiment of this invention.
Figure 14:
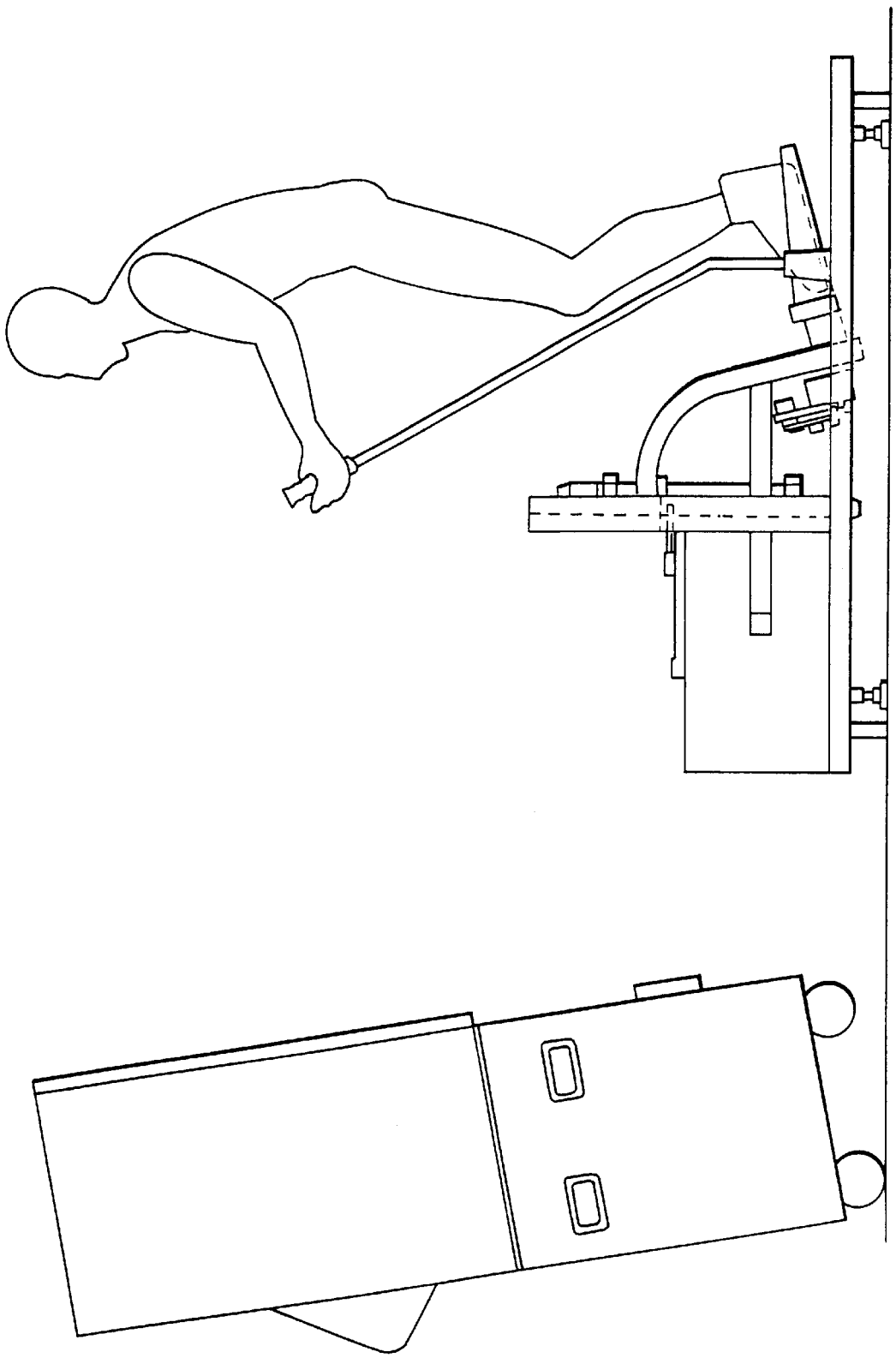
FIG. 14 is a side view of the ski game machine shown in FIG. 13.

FIG. 13 is a perspective view of a ski game machine according to the second embodiment. FIG. 14 is a side view of the ski game machine. With the game machine according to the second embodiment, a player holds bars, which imitate ski poles and are provided on the right and left sides, and puts his/her feet on two pedals which imitate a pair of skis. The player moves the pedals from side to side, thereby controlling the skiing direction. A display for displaying the skiing situation is provided in front of the player.

Figure 15:
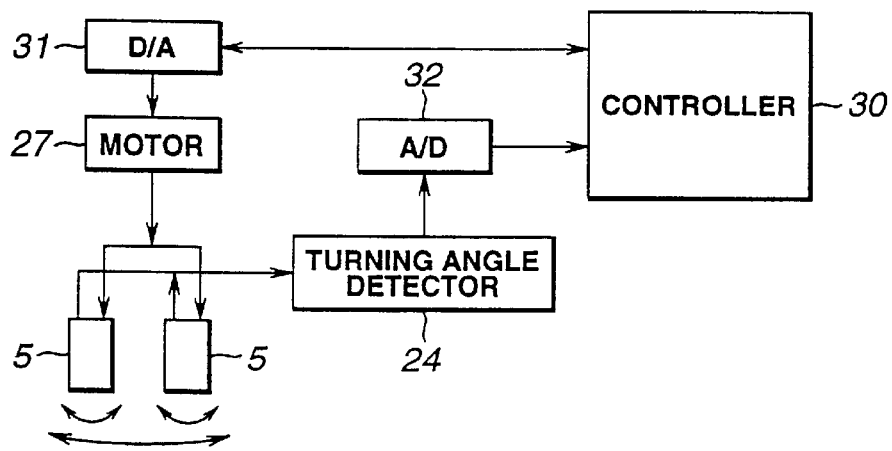
FIG. 15 is a schematic functional block diagram of a part of the game machine according to the second embodiment of this invention.

FIG. 15 is a schematic block diagram of a part of the game machine according to the second embodiment. The movement of the pedals 5 is detected by a turning angle detector 24. This detection signal is converted by an A/D converter 32 from an analog signal to a digital signal, and the converted detection signal is input to a controller 30. The controller 30 generates a digital drive signal on the basis of the movement of the pedals 5, a speed of the skis and the state of landscape in the virtual three-dimensional space, and other information. This drive signal is converted into an analog signal by a D/A converter 31, thereby driving a motor 27. As the motor rotates, the pedals 5 move.

Figure 16:
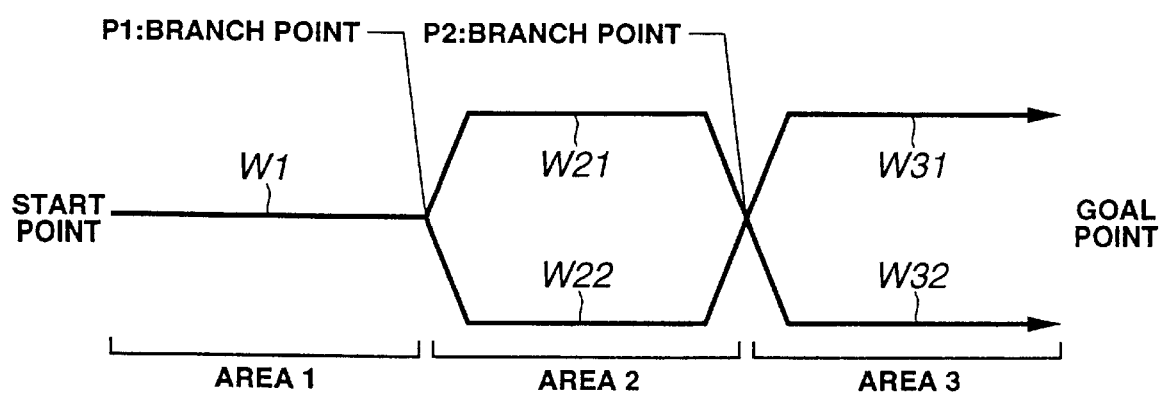
FIG. 16 is a conceptual diagram of a course of the game machine according to the second embodiment of this invention.
Figure 17:
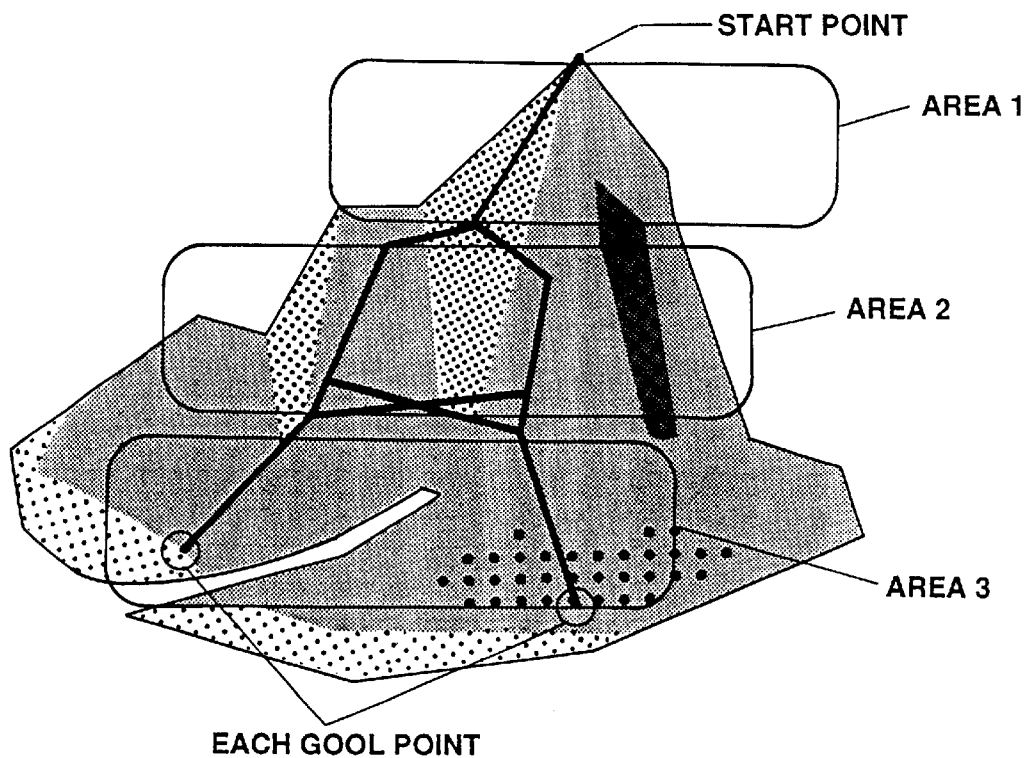
FIG. 17 is a conceptual diagram of a course of the game machine according to the second embodiment of this invention.

FIGS. 16 and 17 are conceptual diagrams of a course of the game machine according to the second embodiment. As shown in these drawings, the player skis down a course, which is divided into three areas, without stopping. There are three areas with a branch point P1 between area 1 and area 2 and also with a branch point P2 between area 2 and area 3. Area 3 has two courses W31 and W32.

Area 1 is a snowy valley close to a crest, area 2 is a forest and high cliffs in the mid-slope of a mountain, and area 3 is a course with obstacles such as steep cliffs and buildings in the vicinity of the foot of the mountain.

The most basic scenario of this game is as follows:

1) A time base race game in which players compete with each other, skiing down a specified course from start to goal.
2) There are branches in the course. By using the same course, the number of stages can be reduced even if the number of branches is large.
3) Branch points are made check points and time is added. If the time has become zero by that point, the game is over.
4) The course selection at branches is made by a player in first place and other players in second through fourth places are forced to follow that course.
5) No continuation is allowed, and only replay can be performed.
6) The game is applicable to a communication game match (a game match up to four players is possible at present).
7) Even if only one player plays the game, the CPU operates the other three players and always creates the situation of a game match with four persons.
8) Corrections are made to data between the players and the situation of competition is always created.
9) The player cannot stop under any circumstances (for example, even at the time of collision with obstacles as is often the case). For example, the player goes on even if he/she makes a motion of falling down, and the game will resume without stopping.
10) When the player reaches the goal, the game is over. There is no extra stage or the like.

(1) Movement of the Camera Position

The camera position moves in a horizontal direction in accordance with inputs of ski-shaped levers 5 under the player's feet. The camera position moves basically according to a volume level of the levers 5. Moreover, a horizontal travel amount of the camera position is changed according to a turning direction of a corner in the course. For example, it is made easier to move the camera in a direction opposite to the turning direction of the curve. Visibility in the direction to which the player intends to turn is improved. Furthermore, at corners or the like in the course, the horizontal travel amount of the camera is changed. For example, it is made easier to move the camera on the side opposite to the turning direction of the curve.

Not only is the camera position moved in a horizontal direction, but the camera is also turned. The camera direction is controlled so that, for example, the camera will always face the character. The horizontal movement of the camera is made in a direction opposite to the cornering direction.

(2) Horizontal Movement of the Camera Position

A specific method of moving the camera position is hereinafter explained.

Figure 18:
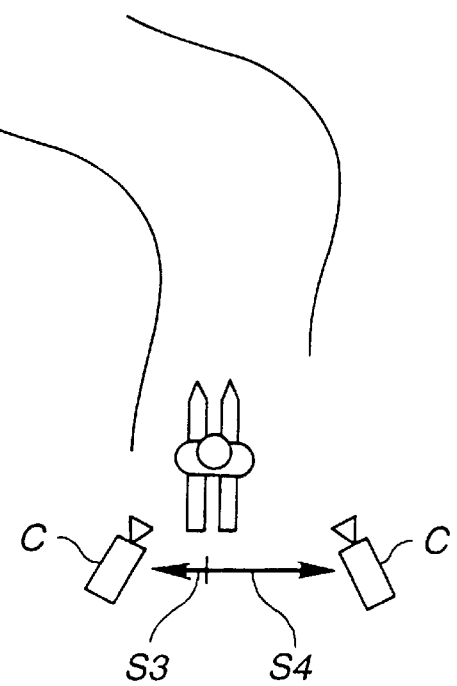
FIG. 18 describes how the camera position moves when a player makes a turn according to the second embodiment of this invention.

FIG. 18 illustrates the movement of the camera position when a player makes a turn. How the course is curved is related to a travel amount. For example, a sum of the corner and the camera moving direction is made the travel amount. FIG. 18 shows a left turn corner where a right movement S4 of the camera is normal, but there is only a little (or may be no) left movement S3.

Figure 19A:
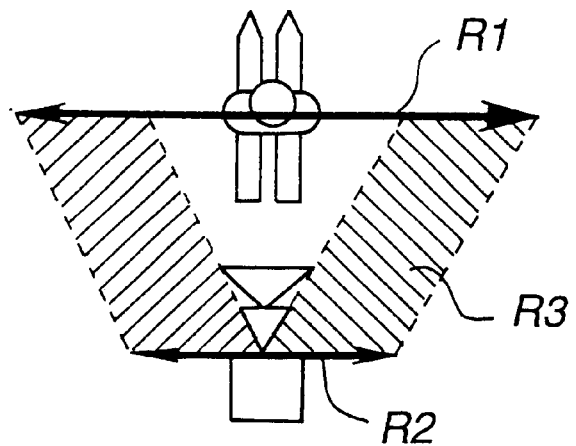
FIG. 19 describes how the movement of pedals 5 corresponds to the movement of the camera position according to the second embodiment of this invention.
Figure 19B:
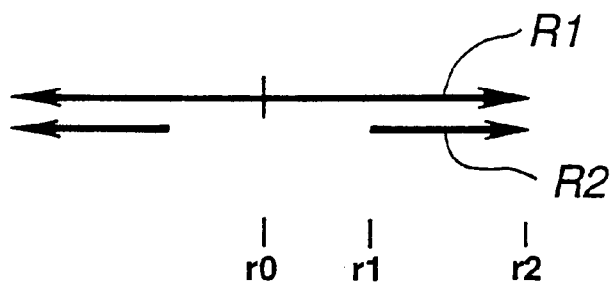

FIG. 19 illustrates how the movement of the pedals 5 corresponds to the movement of the camera position. As can be seen from this drawing, a width of the horizontal camera movement corresponds to the latter half movement of a volume for the pedals 5. In other words, a full open width R1 of the volume in FIG. 19(b) (the range that can be moved by an input unit for the player to input) disagrees with a width R2 corresponding to the horizontal movement of the camera, and there is a so-called free movement. When the volume is from a neutral position r0 to a specified position r1, the camera position does not change even if the volume changes. This range of r0 through r1 is a dead zone. On the other hand, the camera position changes within the range of the position r1 through a maximum volume position r2.

(3) Vertical Movement of the Camera Position

Figure 20:
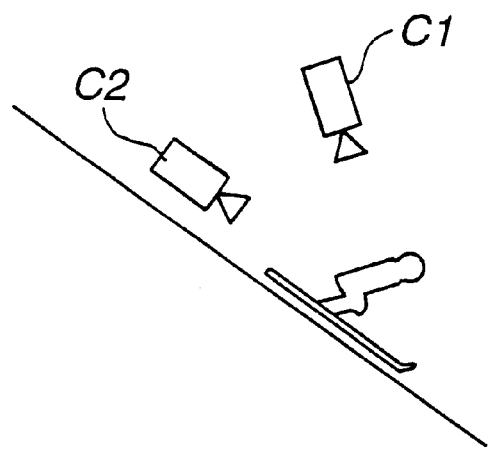
FIG. 20 describes how the camera position moves in a vertical direction according to the second embodiment of this invention.

FIG. 20 illustrates a method of moving the camera position in a vertical direction. A conventional camera position C2 is at a position parallel to a slope no matter how steep the slope is. Accordingly, the camera position is raised, as indicated by C1, according to an angle of the slope.

Specifically speaking, a distance between the camera and the player is changed at the time of deceleration, acceleration or a big jump. For example, the distance is reduced upon deceleration. At the time of acceleration, the camera moves away from the player toward a default position. At the time of a big jump, the camera moves away from the player immediately after the jump and then moves beyond the default position and closer to the player upon landing. Then, with a shock immediately after the landing, the camera returns to the default position in an instant. Changes in the distance upon acceleration or deceleration may be made varied for different characters.

Figure 21:
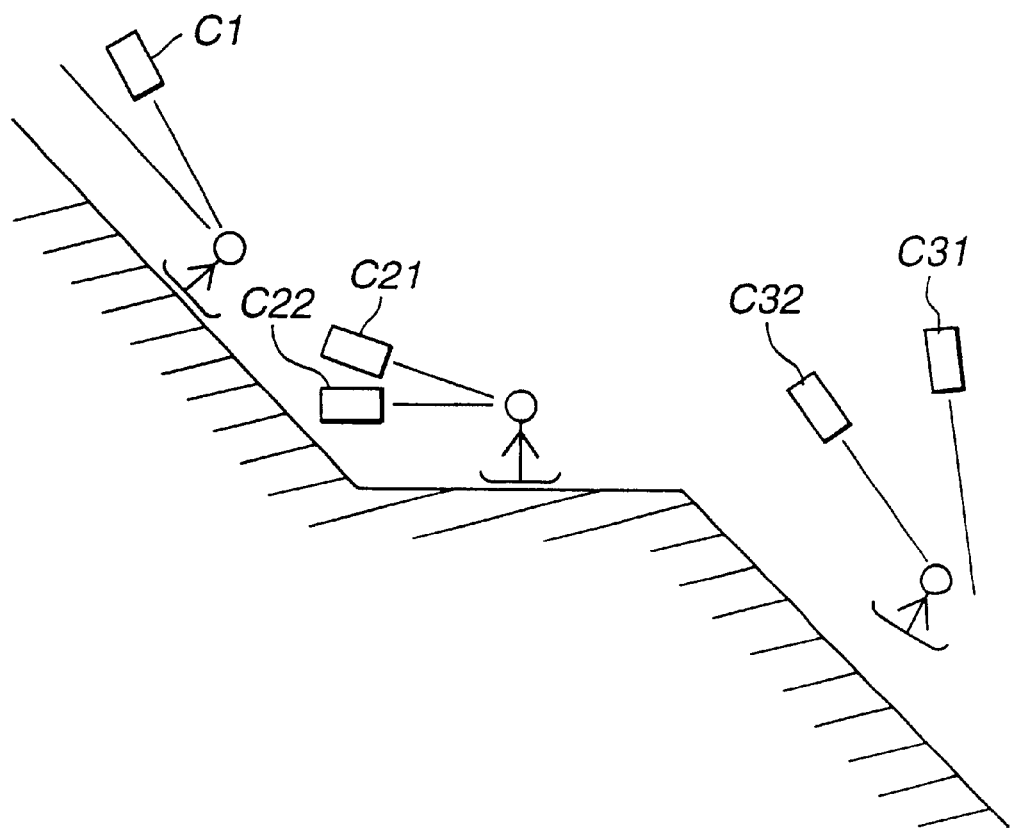
FIG. 21 is a conceptual diagram illustrating the movement of the camera position in a vertical direction according to the second embodiment of this invention.

FIG. 21 is a conceptual diagram which shows the vertical movement of the camera position. C1, C21 and C31 indicate camera positions according to the second embodiment, while C22 and C32 indicate conventional camera positions.

Figure 22A:
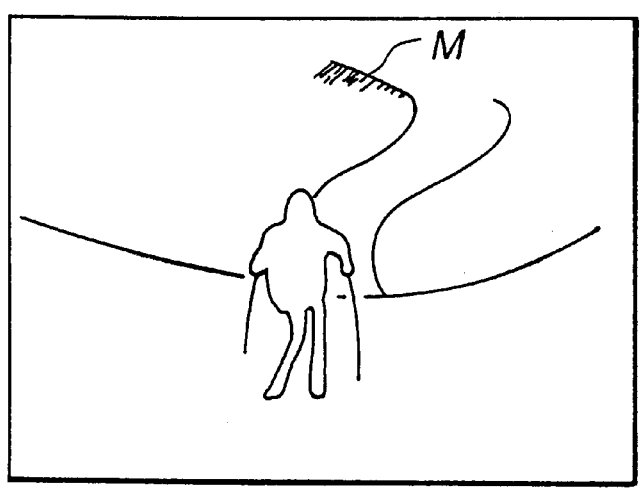
FIG. 22 shows an example picture of a player skiing down a slope according to the second embodiment of this invention, and also indicates the camera position C in such a situation.
Figure 22B:
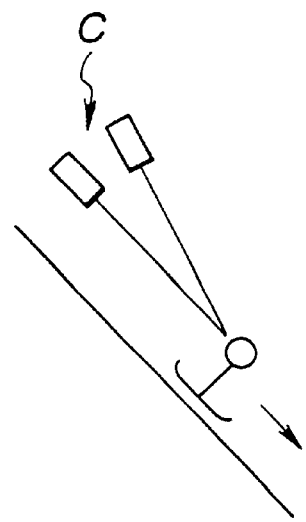

FIG. 22 shows an example picture when the player is skiing down a slope (FIG. 22(a)), and also indicates a camera position C in such a situation (FIG. 22(b)). An image as shown in FIG. 22(a) is obtained as if the camera is looking down upon the course and landscape (mountain) far away.

Figure 23A:
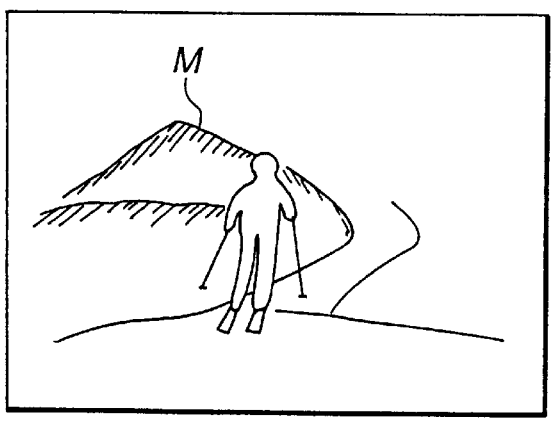
FIG. 23 shows an example picture of the player moving from a slope to a flat according to the second embodiment of this invention, and also indicates the camera position C in such a situation.
Figure 23B:
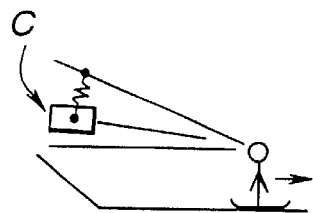

FIG. 23 is an example picture when the player has moved from a slope to a flat (FIG. 23(a)), and also indicates the camera position C in such a situation (FIG. 23(b)). As a result, an image of a distant view of a landscape (mountain M) as in FIG. 23(a) is obtained, where the camera is looking up at the landscape from a position slightly lower than that in FIG. 22(a).

Figure 24A:
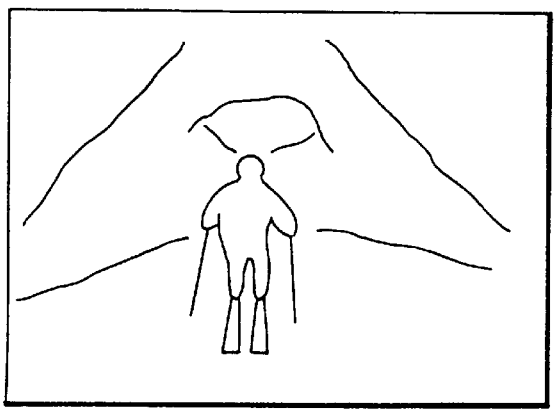
FIG. 24 shows an example picture of the player jumping according to the second embodiment of this invention, and also indicates the camera position C in such a situation.
Figure 24B:
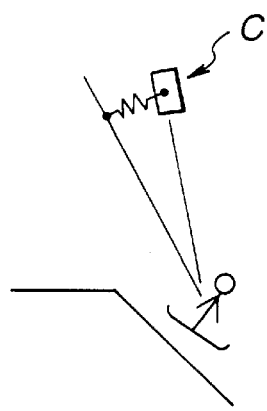

FIG. 24 is an example picture when the player is jumping (FIG. 24(a)), and also indicates the camera position C in such a situation (FIG. 24(b)). As a result, an image of the course comparatively close to the player is obtained as if the camera is looking down upon the course.

(4) Control of the Camera Position at Branch Points

As described above, the course branches in the scenario of the game machine according to this embodiment. The player skis down one of the branch courses. In order to make the game flow naturally, it is desirable not to display the unselected course.

The camera is moved up before a decision is made with regard to a branch direction, so that a branch point cannot be seen. When the player gets to the branch point, the camera moves to a position above the character and provides a picture upon moving away from the character, so that visibility of the course ahead is secured and a distant view of the landscape in the course is made invisible. In the meantime, the course ahead is changed in an instant, thereby leading the player to the branched course ahead without giving a sense of incompatibility. Other players are treated individually in the same manner, and the course ahead can be changed naturally at all times.

Control of the camera position at branch points is hereinafter explained by referring to FIGS. 25 through 34.

Figure 25:
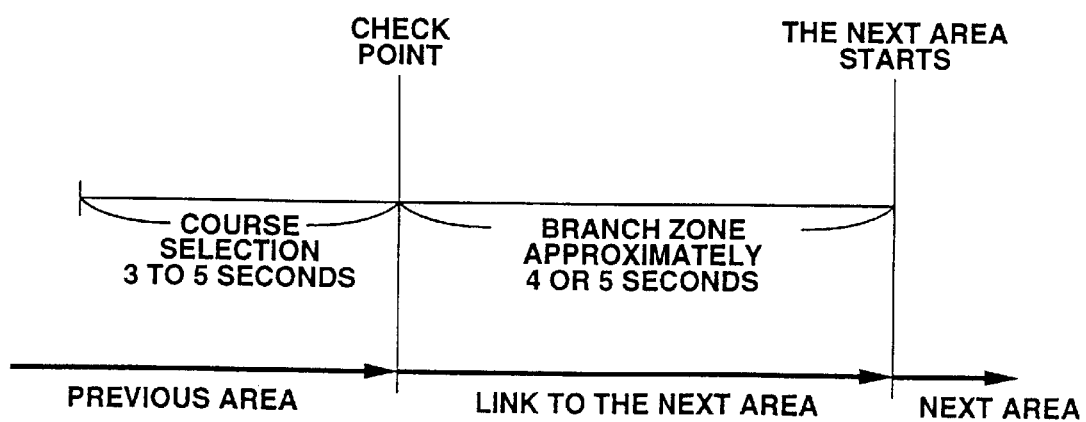
FIG. 25 is a timing chart of controlling the camera position at a branch point according to the second embodiment of this invention.

As shown in FIG. 25, the course branches at the end of each area. Course selection is performed at the end of the previous area (for example, if the player is skiing on the left side of the course, a left side course is selected). The course selection takes three to five seconds. After the check point, the player passes a branch zone which is a link zone to the next area. This takes four to five seconds. Then, the next area starts.

[Step 1]

Figure 26:
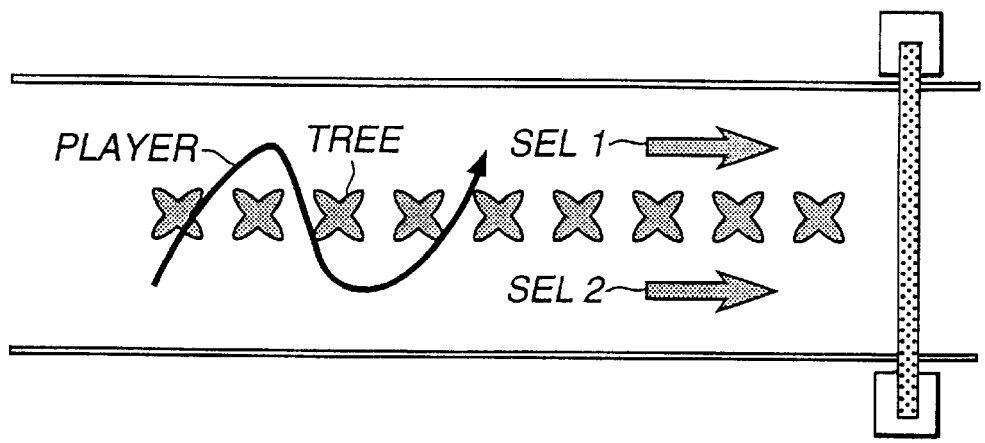
FIG. 26 is a diagram (of a course selection zone), which illustrates how to control the camera position at a branch point according to the second embodiment of this invention.

At the end of the areas 1 and 2, there is a straight part, as shown in FIG. 26, for three to five seconds. Trees (TREE in FIG. 26) and the like are placed in the middle of the course to divide the course into two sections. At this part, the player (PLAYER in FIG. 26) can ski optionally in either the right or left course. However, the following course will be different, depending on which side the player is skiing, either left (SEL1) or right (SEL2), when he/she passes through the check point.

Figure 28:
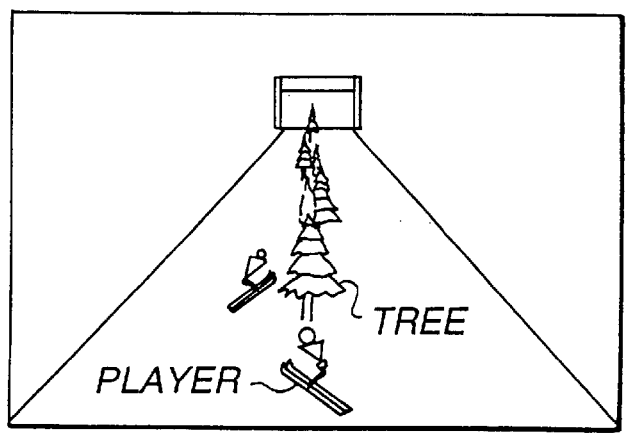
FIG. 28 is an example display picture (of the course selection zone) at a branch point according to the second embodiment of this invention.

FIG. 28 shows a display picture in such a situation. As can be seen in FIG. 28, the camera position is far away from the normal position which is an elevated position behind the player, that is, the camera is pulled further back.

[Step 2]

Figure 29:
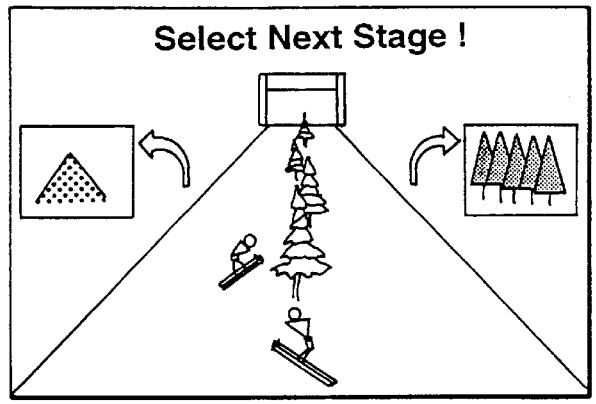
FIG. 29 is an example display picture (of the course selection zone) at a branch point according to the second embodiment of this invention.
Figure 30:
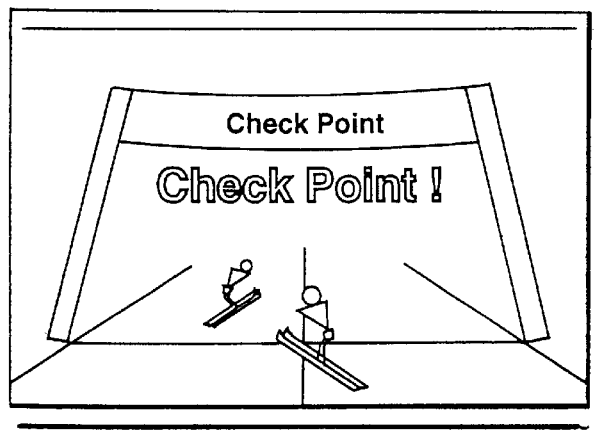
FIG. 30 is an example display picture (of a check point) at a branch point according to the second embodiment of this invention.
Figure 31:
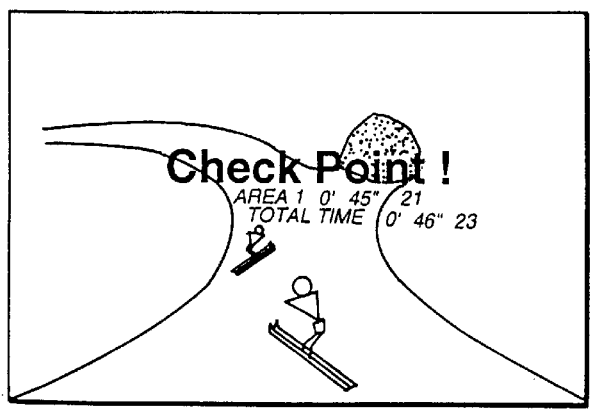
FIG. 31 is an example display picture (of a branch zone) at a branch point according to the second embodiment of this invention.

As shown in FIG. 29, pictures of the next stage are displayed on both sides on the screen. This state continues for three to five seconds. In the example shown in FIG. 29, a "mountain" is displayed on the left side and a "forest" is displayed on the right side. The player can select the course that he/she likes on the basis of the above-mentioned display. The position, contents and the like of letters may be changed.

[Step 3]

The course is decided in accordance with the side (right or left) where the first player who has reached a check point is. In an example shown in FIG. 30, the player is on the left side and, therefore, a left course is selected. The letters "Check Point" or the like are displayed at the same time the player reaches the check point. After the player passes through the check point, the camera moves to the default position.

[Step 4]

Figure 27:
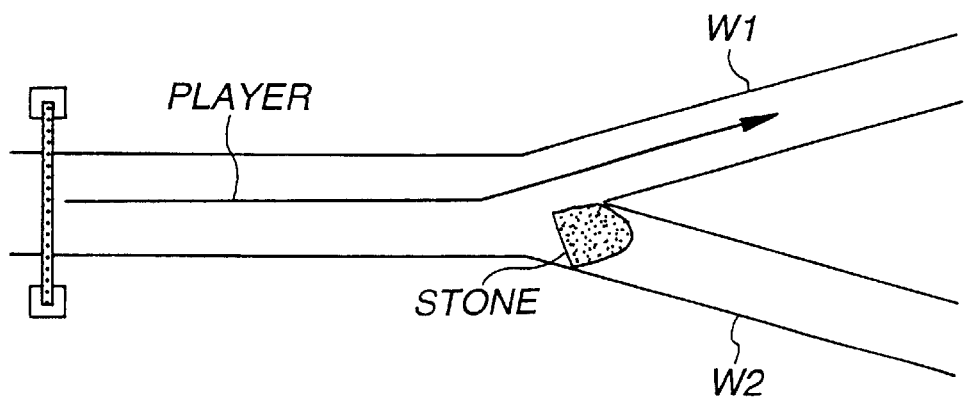
FIG. 27 is a diagram (of a branch zone), which illustrates how to control the camera position at a branch point according to the second embodiment of this invention.

Concerning the course W2 which was not selected when the player reached the check point, as shown in FIG. 27, the course W2 is closed with some obstacle such as a stone (STONE in FIG. 27) after the course decision, so that the player cannot ski in the course W2. While the player is advancing in the branch area, area passing time and total time are displayed as in FIG. 31.

[Step 5]

Figure 32:
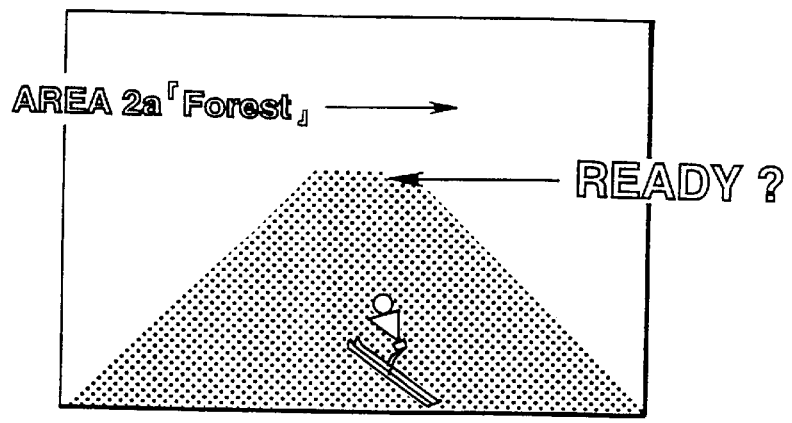
FIG. 32 is an example display picture (of the branch zone) at a branch point according to the second embodiment of this invention.
Figure 33:
FIG. 33 is an example display picture (of the branch zone) at a branch point according to the second embodiment of this invention.
Figure 34:
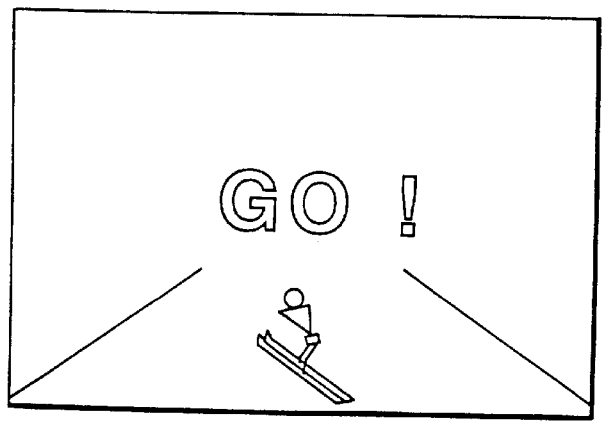
FIG. 34 is an example display picture (of the branch zone) at a branch point according to the second embodiment of this invention.

As shown in FIGS. 32 and 33, (1) a name of the next area and (2) the letters "READY?" are displayed. These letters appear from right and left. Then, as shown in FIG. 34, the letters "GO!" appear at the timing right when the next course starts.

(5) Other Features

An input button is provided at the top of the ski pole. By pushing this button, the processing is performed to make it easier for the player to make a turn. Accordingly, it is possible to simulate the situation where the player makes a turn with his/her strength put onto the ski poles.

Moreover, a scene with a train appearing from behind is provided. A sound of the approaching train is produced to call the player's attention before the train appears, thereby enhancing the effect on the player.

The present invention is not limited to the above-described embodiments, and modifications can be made to the invention within the range not departing from the gist of this invention. For example, this invention may be applied not only to a car race game or a ski game, but also to a motorcycle race game, a motorboat race game, a soccer game, a tennis game or the like. It is needless to say that these games are included in the scope of this invention.

In this specification, means does not necessarily indicates physical means, but also includes the case where each means function is implemented by software. Moreover, one means function may be implemented by two or more physical means, or two or more means functions may be implemented by one physical means.

What is claimed is:

1. A picture processing apparatus comprising:
   a shape memory with shape data of an object previously stored therein;
   a processor for setting a coordinate value of an object in a three-dimensional virtual space on the basis of the shape data stored in said shape memory;
   transformation means for receiving the coordinate value set by said processor and transforming the coordinate value into a visual field coordinate system based on a specified visual point; and
   visual point setting means for moving the visual point position from a predetermined standard position for a predetermined base object as defined in the three-dimensional virtual space on the basis of data of the base object as well as changes in the situation caused by the movement of the base object, and for sending a new position after the movement to said transformation means.

2. A picture processing apparatus according to claim 1, wherein said visual point setting means sets a sight line direction in addition to the visual point position.

3. A picture processing apparatus according to claim 1, wherein said visual point setting means sets the visual point position in accordance with a turning angle of the object.

4. A picture processing apparatus according to claim 2, wherein said visual point setting means sets the visual point position and the sight line direction in accordance with a turning angle of the object and causes a displacement corresponding to the visual point position to disagree with a displacement corresponding to the sight line direction.

5. A picture processing apparatus according to claim 4, wherein a ratio of the displacement of the visual point position to the displacement of the sight line direction is 1:5.

6. A picture processing apparatus according to claim 1, wherein said visual point setting means sets the visual point position according to acceleration applied to the object when it makes a turn.

7. A picture processing apparatus according to claim 6, wherein the displacement of the visual point position is proportionate to the acceleration.

8. A picture processing apparatus according to claim 6, wherein a direction of the visual point position displacement is identical to a direction of the acceleration.

9. A picture processing apparatus according to claim 6, wherein a direction of the visual point position displacement is opposite to a direction of the acceleration.

10. A picture processing apparatus according to claim 2, wherein said visual point setting means causes a travelling direction of the object, the sight line direction, and a course in which the object should move, to disagree with one another.

11. A picture processing apparatus according to claim 2, wherein said visual point setting means sets the visual point position and the sight line direction so that the base object will be situated in the center of a picture when a displacement is small, while the base object will be situated at the edge of a picture when the displacement is large.

12. A picture processing apparatus according to claim 1, wherein said visual point setting means sets the visual point position by following the movement of the base object.

13. A picture processing apparatus according to claim 12, wherein said visual point setting means sets a time delay between the movement of the base object and the movement of the visual point position.

14. A picture processing apparatus according to claim 1, wherein said visual point setting means sets the visual point position in accordance with a specified manipulated variable regarding the base object.

15. A picture processing apparatus according to claim 14, wherein the displacement of the visual point position has a nonlinear relationship with the specified manipulated variable.

16. A picture processing apparatus according to claim 14, wherein a part of the specified manipulated variable includes a dead zone where no displacement of the visual point position is caused.

17. A picture processing apparatus according to claim 1, wherein said visual point setting means sets the visual point position in accordance with acceleration of the object.

18. A picture processing apparatus according to claim 17, wherein the visual point position is set upon deceleration of the object so that the visual point will approach the base object.

19. A picture processing apparatus according to claim 17, wherein the visual point position is set upon acceleration of the object so that the visual point will move away from the object and will approach a predetermined position.

20. A picture processing apparatus according to claim 17, wherein the visual point position is set when the object jumps so that the visual point will move away from the object after the jump, will then approach a predetermined position and will come to the predetermined position upon landing.

21. A picture processing apparatus according to claim 1, wherein when the base object is the object and moves in a branched course, said visual point setting means sets the visual point position so that the visual point will move away from the object while the object is moving between a predetermined first position in front of a branch point and a second position, and the visual point will return to the predetermined position when the object passes through the second position.

22. A picture processing apparatus according to claim 21, wherein the selection of the branched course is made according to the state of the object at the second position.

23. A picture processing apparatus according to claim 22, wherein when the selection of the branched course is made, an obstructive limitation is given to a course which has not been selected.

24. A picture processing method comprising:
   a coordinate setting step of setting a coordinate value of an object in a three-dimensional virtual space on the basis of shape data stored in a shape memory;
   a transformation step of receiving the coordinate value set by said coordinate setting step and transforming the coordinate value into a visual field coordinate system based on a specified visual point; and
   a visual point setting step of moving the visual point position from a predetermined standard position on the basis of data of a predetermined base object as defined in the three-dimensional virtual space as well as changes in the situation caused by the movement of the base object, and setting a new position after the movement as the specified visual point in said transformation step.

25. A picture processing method according to claim 24, wherein in said visual point setting step, a sight line direction is set in addition to the visual point position.

26. A picture processing method according to claim 24, wherein in said visual point setting step, the visual point position is set according to a turning angle of the object.

27. A picture processing method according to claim 24, wherein in said visual point setting step, the visual point position is set according to acceleration applied to the object when it makes a turn.

28. A picture processing method according to claim 24, wherein in said visual point setting step, the visual point position and the sight line direction are set so that the base object will be situated in the center of a picture when a displacement is small, while the base object will be situated at the edge of a picture when the displacement is large.

29. A picture processing method according to claim 24, wherein in said visual point setting step, the visual point position is set by following the movement of the base object.

30. A picture processing method according to claim 24, wherein in said visual point setting step, the visual point position is set in accordance with a specified manipulated variable regarding the base object.

31. A picture processing method according to claim 24, wherein in said visual point setting step, the visual point position is set in accordance with acceleration of the object.

32. A picture processing method according to claim 24, wherein in said visual point setting step, when the object moves in a branched course, the visual point position is set so that the visual point will move away from the object while the object is moving between a predetermined first position in front of a branch point and a second position, and the visual point will return to the predetermined position when the object passes through the second position.

33. A medium with a program stored therein for causing a computer to perform a coordinate setting procedure, a transformation procedure and a visual point setting procedure,
   said coordinate setting procedure for setting a coordinate value of an object in a three-dimensional virtual space on the basis of shape data stored in a shape memory,
   said transformation procedure for receiving the coordinate value set by said coordinate setting procedure and for transforming the coordinate value into a visual field coordinate system based on a specified visual point, and
   said visual point setting procedure for moving the visual point position from a predetermined standard position on the basis of data of a predetermined base object as defined in the three-dimensional virtual space as well as changes in the situation caused by the movement of the base object, and setting a new position after the movement as the specified visual point in said transformation step.

* * * * *